United States Patent
Megiddo et al.

(10) Patent No.: US 7,752,536 B2
(45) Date of Patent: Jul. 6, 2010

(54) DESIGNATING, SETTING AND DISCOVERING PARAMETERS FOR SPREADSHEET DOCUMENTS

(75) Inventors: Eran Megiddo, Bellevue, WA (US); Daniel Y. Parish, Kirkland, WA (US); Daniel Battagin, Bellevue, WA (US); Robert L. Archer, Seattle, WA (US); Amarinder Singh Grewal, Redmond, WA (US); Justin Frederick Rockwood, Kirkland, WA (US); Sean Boon, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 11/223,180

(22) Filed: Sep. 9, 2005

(65) Prior Publication Data
US 2007/0061698 A1 Mar. 15, 2007

(51) Int. Cl.
*G06F 17/21* (2006.01)
(52) U.S. Cl. ................ 715/216; 715/200
(58) Field of Classification Search ............ 715/216
See application file for complete search history.

(56) References Cited

U.S. PATENT DOCUMENTS

| | | | |
|---|---|---|---|
| 5,371,675 A | 12/1994 | Greif et al. ............ | 715/503 |
| 5,418,902 A | 5/1995 | West et al. ............ | 395/148 |
| 5,708,827 A | 1/1998 | Kaneko et al. ........ | 395/764 |
| 5,727,161 A | 3/1998 | Purcell, Jr. ............ | 705/7 |
| 5,890,174 A | 3/1999 | Khanna et al. ........ | 707/504 |
| 5,987,481 A | 11/1999 | Michelman et al. ... | 707/503 |
| 6,460,059 B1 | 10/2002 | Wisniewski ........... | 707/503 |
| 6,592,626 B1 | 7/2003 | Bauchot et al. ........ | 715/503 |
| 6,757,867 B2 | 6/2004 | Bauchot et al. ........ | 715/504 |
| 6,988,241 B1 * | 1/2006 | Guttman et al. ....... | 715/220 |
| 2001/0055013 A1 * | 12/2001 | Fuki ..................... | 345/419 |
| 2002/0065846 A1 * | 5/2002 | Ogawa et al. .......... | 707/503 |
| 2002/0078086 A1 | 6/2002 | Alden et al. ........... | 707/503 |
| 2003/0033329 A1 | 2/2003 | Bergman et al. ....... | 707/503 |
| 2003/0120999 A1 | 6/2003 | Miller et al. ........... | 715/503 |
| 2004/0103366 A1 | 5/2004 | Peyton-Jones et al. . | 715/503 |

OTHER PUBLICATIONS

Stinson, Craig and Mark Dodge. Microsoft Office Excel 2003 Inside Out. 2004. Microsoft Press.*

(Continued)

*Primary Examiner*—Doug Hutton
*Assistant Examiner*—Tionna Smith
(74) *Attorney, Agent, or Firm*—Merchant & Gould PC

(57) ABSTRACT

For standalone spreadsheet applications and/or Web-based spreadsheet services, the ability to designate, discover and set parameters for spreadsheet documents is provided. When creating a spreadsheet document, the ability to designate certain cells or ranges of cells as parameters to a spreadsheet is enabled. Furthermore, whether viewed in a standalone spreadsheet application or via a Web service, the ability to discover these parameters through the user interface or object model is provided. The ability to set or change these parameters one at a time or in bulk and drive the changes into the calculation model is also provided. Accordingly, whether viewed in a standalone spreadsheet application or via a Web rendering service, the effect of the parameters entered by the user can be calculated and viewed at once. The ability to suspend recalculation of a workbook until all relevant values, such as a current set of parameters, are obtained is also enabled.

15 Claims, 19 Drawing Sheets

OTHER PUBLICATIONS

Khor, Siew Moi. Jun. 2003. Microsoft Office Excel 2003 Preview. Microsoft Office Excel 2003 Technical Articles. Microsoft Corporation Publishing.*

Granet, V., "The Xx1 spreadsheet project," *Linux Journal,* 1999, http://www.linuxjournal.com/article/3186, downloaded Sep. 21, 2005, 10 pages.

Hudson, S.E., "User interface specification using an enhanced spreadsheet model," *ACM Transactions on Graphics,* 1994, 13(3), 209-239.

Jones, S.P., "A user-centred approach to functions in Excel," *ICEP,* 2003, 165-176.

Smedley, T.J., et al., "Expanding the utility of spreadsheets through the integration of visual programming and user interface objects," *The ACM Digital Library,* 1996, 148-155.

Travé, S., "Dynamic what-if analysis: exploring computational dependencies with slidercells and micrographs," *Mosaic of Creativity,* 1995, 280-281.

\* cited by examiner

DESIGNATING, SETTING AND DISCOVERING PARAMETERS FOR SPREADSHEET DOCUMENTS

FIELD OF THE INVENTION

The present invention relates to designating, setting and discovering parameters for documents, such as spreadsheets, or workbooks.

BACKGROUND OF THE INVENTION

Spreadsheet software, such as MICROSOFT's EXCEL software, operates to simulate paper spreadsheets, also sometimes called worksheets, or workbooks, in which columns of numbers are operated upon mathematically, e.g., summed, multiplied, etc., for budgets, plans, models and other tasks. A typically spreadsheet software user interface appears on screen as a matrix of rows and columns, the intersections of which are called "cells." The cells can be filled with labels, numeric values or formulas. Labels are descriptive text such as "Rent" and "Gross Sales." Values are the actual numeric data, and formulas command the spreadsheet to perform specific calculations based on the values; for example, the formula SUM CELLS A5 TO A10, may cause the spreadsheet software to sum the cells found at column A, rows 5 to 10. Formulas allow interrelationships of cells, and they are easy to create. For instance, one may merely point to a cell and click, and then press a key (+, -, etc.) of any arithmetic operation intended to affect the cell. For example, the creation of a formula might be "the contents of this cell PLUS the contents of this cell DIVIDED BY the contents of the next cell over to the left."

After numbers are added or changed, the formulas generally recalculate the data automatically or at the initiation of the user, e.g., with the press of a key. This can create a recalculation "ripple" effect throughout multiple cells. Since the contents of any cell can be calculated with or copied to any other cell, a total of one column can be used as a detail item in another column. For example, the total from a column of expense items can be carried over to a summary column showing all expenses. If the contents of a cell in the detail column changes, its column total changes, which is then copied to the summary column, and the summary total changes.

A powerful tool for bankers, stock brokers, economists, and the like, such a ripple effect lets a user create a plan or model, plug in different assumptions about the model, i.e., change parameters, and immediately see the impact on the bottom line. This "what if?" capability makes the spreadsheet indispensable for budgets, plans and other equation-based tasks. The "what if?" capability thus allows users to change underlying parameters, such as interest rate, of a mathematical model, such as growth of bank account over time. The "what if?" similarly allows a user to change underlying facts, such as starting bank account balance, the formulas interrelating the cells, such as calculating interest with or without a formula that compounds interest, and even the names of the cells to address different mathematical scenarios.

Thus, currently, any information concerning the cells of a spreadsheet can be altered by the user, so that the user can see how the alteration plays out in the overall model. However, the reality is that generally, once a model is set up, certain aspects of the model are not intended for change. For instance, it may be known by the user, in the above-described growth example, that the starting bank account balance is $2000, and that such fact will not change. Accordingly, it would seem an unnecessary capability of the spreadsheet that such fact could be altered. Similarly, the cells with the labels in them, while alterable, do not change the result of the growth formula calculation, i.e., whether a certain column or value is labeled "growth rate" or "interest rate" is not relevant to the underlying formulas. It seems difficult, therefore, to distinguish under the current spreadsheet model, between cells intended as parameters for tweaking under different assumptions, and those intended as unalterable fixtures, or given parts of the model.

This tends to be well and fine for the creator of the spreadsheet at issue, because the creator generally remembers which the relevant parameters are for tweaking. However, as soon as a third party user unrelated to its creation views the spreadsheet and the model it represents, that third party user will have to undergo a difficult exercise of ascertaining which cells were intended as parameters, and which were not. Such third party user may not know, for instance, that a $2000 starting balance is a given part of the model. Moreover, as a mathematical model becomes less trivial than the growth example given herein, even the creator of the model may have difficulty remembering which parts of the document are parameters, and which are not.

Accordingly, currently, a user of a spreadsheet cannot explicitly designate a cell of a spreadsheet as a parameter. For a similar reason, a user cannot discover which parts of the spreadsheet are parameters. And still further, for similar reasons, a user cannot alter or set parameters, as such, i.e., as distinguished from parts of the model that are not parameters. These deficiencies associated with parameters of spreadsheet documents described remain unaddressed in the art.

Furthermore, historically, spreadsheets have been standalone applications, wherein a user is co-located with a local computer having a processor executing the spreadsheet software installed on the local computer, such as might be the case for any of the above-described scenarios.

With the advent and explosion of the Internet, however, computer users have grown accustomed to conveniently accessing virtually any kind of electronic document from virtually any location. In particular, the proliferation of the World Wide Web (the "Web") and Web browser application programs has made accessing many kinds of documents, such as text and graphics documents, very convenient. Through a Web browser application program, a user can access and view many types of electronic documents without the need for any additional software, including spreadsheet documents.

Thus, for instance, a user can create a spreadsheet document on a local machine, "publish" [that spreadsheet document to a server, from which any authorized user can view the spreadsheet document via a Web browser. When rendered in the Web browser, the spreadsheet is displayed in a manner that is substantially similar to the spreadsheet when displayed by a spreadsheet application program. However, currently, similar to the above-described client application deficiencies, users cannot designate any cells as parameters when creating a spreadsheet document for display on a Web browser either. For similar reasons, users cannot discover which parameters apply to the spreadsheet and cannot set or alter those parameters.

Accordingly, it is not currently possible for users to lockdown a model in a spreadsheet and make only certain cells editable. These cells in effect are the "function" parameters that can be changed. The spreadsheet model represents the function or functions. While there currently is a way to lockdown a spreadsheet and make only certain cells editable, this is a user interface (UI) driven lockdown wherein there is no mechanism to explicitly designate certain cells as the parameters to a spreadsheet, or to have that mechanism track cells moving and the workbook changing. Since there is no way to designate cells as parameters, there is also no way to call a spreadsheet to query for the available parameters to the spreadsheet. Furthermore, in the case of existing spreadsheet server products, it is not yet possible to edit cells at all. These and other problems of spreadsheet functionality described herein leave unaddressed problems in the art.

SUMMARY OF THE INVENTION

In view of the foregoing, for standalone spreadsheet applications and/or Web-based spreadsheet services, the invention provides the ability to designate, discover and set parameters for spreadsheet documents. In various non-limiting embodiments, when creating a spreadsheet document, the invention provides the ability to designate certain cells or ranges of cells as parameters to a spreadsheet. Furthermore, whether viewed in a standalone spreadsheet application or via a Web service, the invention provides the ability to discover these parameters through the user interface or object model. Moreover, the ability to set or change these parameters one at a time or in bulk and drive the changes into the calculation model is also provided. Accordingly, whether viewed in a standalone spreadsheet application or via a Web service, the effect of the parameters entered by the user can be calculated and viewed at once. The invention also supports the ability to suspend recalculation of a workbook until all relevant values, such as parameters, are obtained.

Other features of the present invention are described below.

BRIEF DESCRIPTION OF THE DRAWINGS

The designation, discovery and setting of parameters for spreadsheet documents in accordance with the invention is further described with reference to the accompanying drawings in which:

FIGS. 5A, 5B, 5C, 5D, 5E, 5F, 5G, 5H, 5I, 5J and 5K illustrate an exemplary non-limiting screenshot sequence from authoring a workbook and designating parameters, to discovering the parameter list associated with the document, and rendering the workbook via the Web allowing for the editing of parameters set forth in the parameter list in accordance with the invention;

DETAILED DESCRIPTION OF ILLUSTRATIVE EMBODIMENTS

Overview

Figure 1:
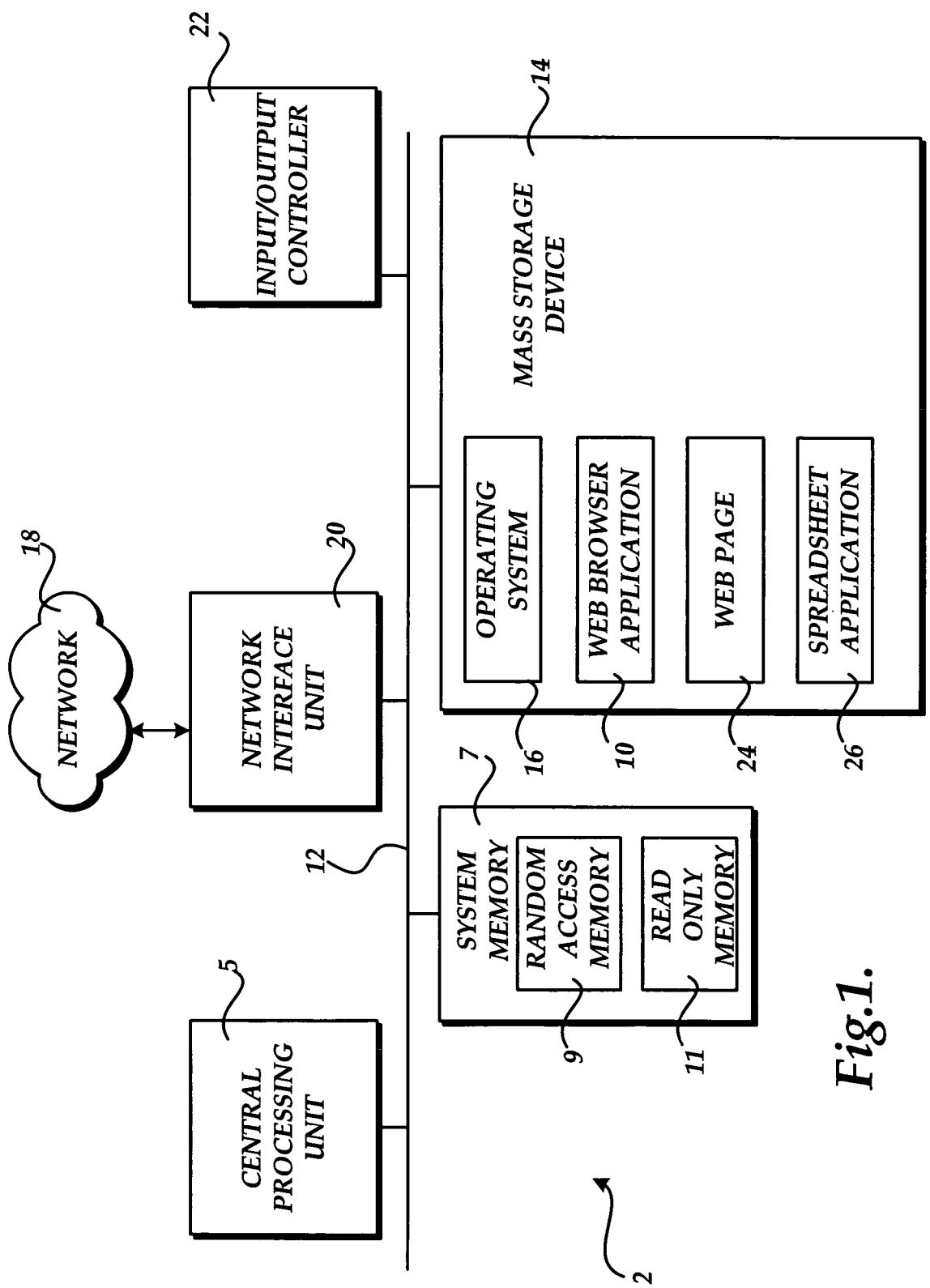
FIG. 1 is a block diagram representing an exemplary non-limiting computing system environment in which the present invention may be implemented.

As discussed above, whether based on a standalone spreadsheet application or a Web server spreadsheet service, it is not currently possible for users to lockdown a model in a spreadsheet and make editable only cells representing parameters. With standalone spreadsheet applications, while there is a way to lockdown a spreadsheet and make only certain cells editable, such functionality is UI driven without regard to parameters, designated as such. There is also no way to call a spreadsheet to query for the available parameters to it. Furthermore, in the case of Web based spreadsheet servers that enable rendering of spreadsheet documents, it is not presently possible to edit cells at all. Accordingly, the invention provides the ability to designate certain cells of spreadsheets as parameters at design time, so that when the document is viewed via either a standalone application or Web-based spreadsheet service, the client or server, respectively, is able to discover which cells are parameters, and to provide alternate UI, or object model (OM), to edit the values in those cells specifically designated as parameters.

Exemplary Networked and Distributed Environments

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer. The mass storage device 14 and RAM 9 may also store one or more program modules. In particular, the mass storage device 14 and the RAM 9 may store a Web browser application program 10. As known to those skilled in the art, the Web browser application program 10 is operative to request, receive, render, and provide interactivity with electronic documents, such as a Web page 24 that has been formatted using HTML. Moreover, the Web browser application program 10 may be operative to execute scripts contained in the Web page 24, such as scripts expressed utilizing the JAVA SCRIPT language from SUN MICROSYSTEMS, INC. According to one embodiment of the invention, the Web browser application program 10 comprises the INTERNET EXPLORER Web browser application program from MICROSOFT CORPORATION. It should be appreciated, however, that other Web browser application programs from other manufacturers may be utilized to embody the various aspects of the present invention, such as the FIREFOX Web browser application from the MOZILLA FOUNDATION.

As will be described in greater detail below, the Web page 24 may comprise a viewable representation of a spreadsheet document. In particular, the Web page 24 may include HTML and scripts which, when displayed by the Web browser application 10, provide a visual display for a spreadsheet. Moreover, the scripts included in the Web page 24 allow a user of the computer to interact with the display provided by the Web browser application 10 and modify the spreadsheet. From the visual display provided by the Web browser application 10, the user may also be permitted to request that the native spreadsheet file be opened in a spreadsheet application program 26. In response to such a request, the spreadsheet application 26 will be launched and the native spreadsheet file corresponding to the spreadsheet expressed by the Web page 24 will be loaded by the spreadsheet application program 26. The spreadsheet application program 26 may comprise the EXCEL spreadsheet application program from MICROSOFT CORPORATION or another spreadsheet application program from another manufacturer. Additional details regarding the process for viewing and interacting with a spreadsheet from within the context of a Web browser application 10 will now be provided with respect to FIG. 2.

Figure 2:
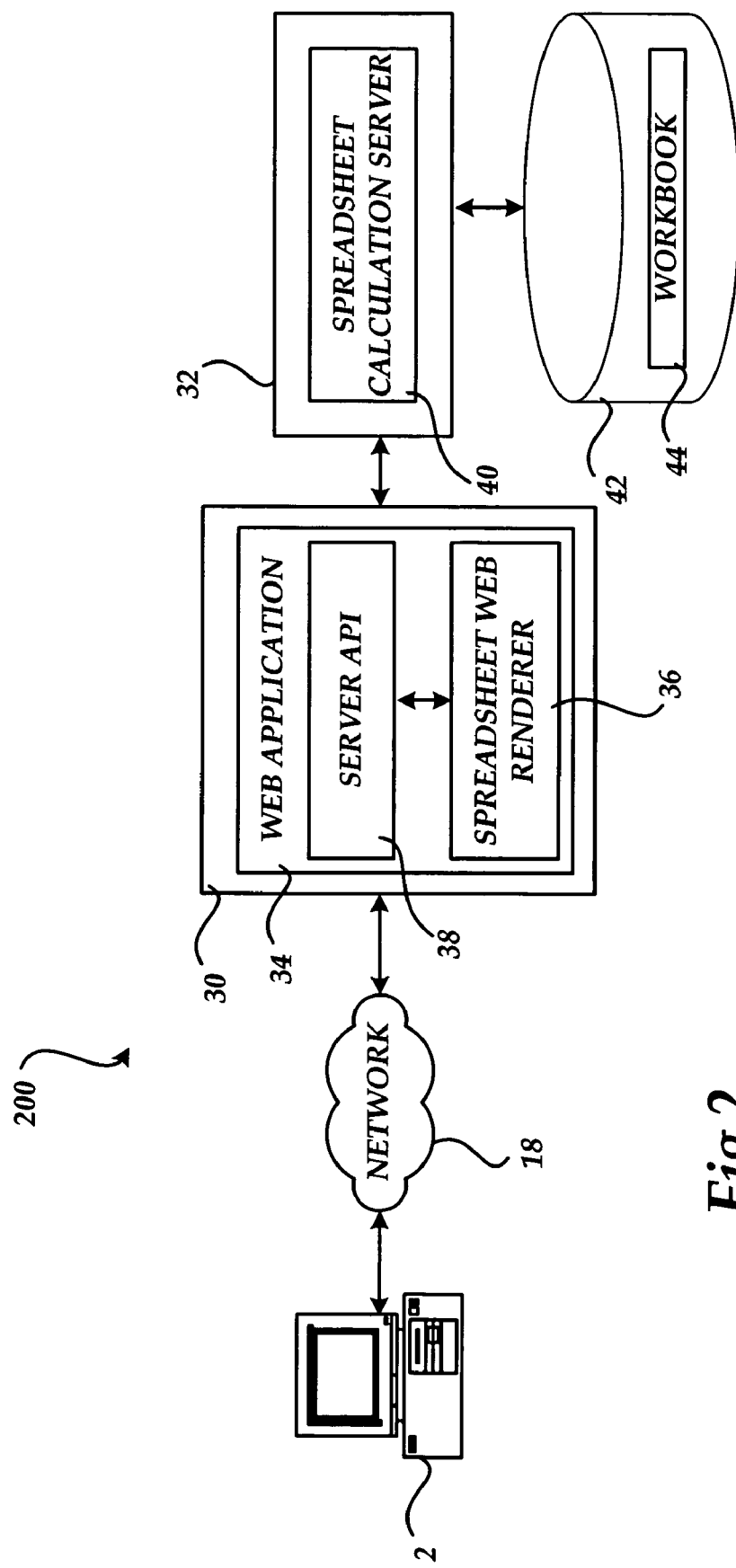
FIG. 2 is a block diagram representing an exemplary network environment in which the present invention may be implemented.

Referring now to FIG. 2, a network architecture diagram will be described that illustrates an operating environment for the various embodiments of the invention. As shown in FIG. 2, the computer 2 is connected to a network 18. Also connected to the network 18 is an Application Server 30. The Application Server 30 comprises a server computer which may contain some or all the conventional computing components described above with respect to FIG. 1. Additionally, the Application Server 30 is operative to execute a Web server application for receiving and responding to requests for documents stored at or accessible to the Application Server 30. Moreover, the Application Server 30 is operative to receive and respond to requests for pages generated by a Web application 34. It should be appreciated that the Web application 34 may comprise code executable at the application server 30, executable code for communicating with other computers, and may include templates, graphics, audio files, and other content known to those skilled in the art.

According to one aspect of the invention, the Web application 34 is operative to provide an interface to a user of the computer 2 to interact with a spreadsheet or workbook accessible via the network 18. In particular, the Web application 34 utilizes a server application programming interface ("API") 38. According to this embodiment of the invention, the server API 38 is operative to enable communication with a spreadsheet calculation server 32. The spreadsheet calculation server 32 is operative to execute a spreadsheet calculation server program 40. The spreadsheet calculation server program 40 comprises an executable program for retrieving and calculating spreadsheets, and such as the workbook 44 stored in the database 42. It should be appreciated that in the embodiments of the invention described herein, the spreadsheet calculation server program 40 comprises a calculation server ("CS" as abbreviated elsewhere herein), such as the EXCEL CALCULATION SERVER program from MICROSOFT CORPORATION. However, other programs for calculating a spreadsheet on a server computer may be utilized. It should also be appreciated that the calculation server 32 may include many of the conventional hardware and software components discussed above with respect to FIG. 1.

As will be discussed in greater detail below, the computer 2 may transmit a request to the Application Server 30 to view the workbook 44 within the context of the Web browser application 10. In response to such a request, the Web application 34 communicates with the calculation server 32 through the server API 38. In particular, the Web application 34 requests from the calculation server 32 the appropriate workbook 44. As will be discussed in greater detail below, in response to such a request, the calculation server program 40 retrieves the workbook 44 and converts the workbook 44 into a spreadsheet document format, such as an XML-based document format. As known to those skilled in the art, XML-based formats comprise a markup language schema for expressing the contents of a spreadsheet. Once the spreadsheet calculation server program 40 has converted the requested workbook 44 to the spreadsheet document format, the spreadsheet document formatted file is returned to the Web application 34.

Once the Web application 34 has received from the calculation server 32 the spreadsheet document formatted representation of the workbook 44, the Application Server 30 utilizes the spreadsheet Web renderer 36 to convert the formatted spreadsheet into a representation of the spreadsheet that may be rendered by the Web browser application 10. In particular, the spreadsheet Web renderer 36 converts the formatted document into a document containing HTML that may be rendered by the Web browser application 10 to display the spreadsheet. Moreover, according to embodiments of the invention, the spreadsheet Web renderer 36 is capable of outputting HTML which, when rendered by the Web browser application 10, appears substantially similar to the output of the spreadsheet application 26 when utilized to view the same workbook 44. Once the spreadsheet Web renderer 36 has completed rendering the file, it is returned by the application server 30 to the computer 2 where it may be rendered by the Web browser application 10.

As will also be discussed in greater detail below, the spreadsheet Web renderer 36 may also be operative to render into the markup language file one or more scripts for allowing the user of the computer 2 to interact with the spreadsheet within the context of the Web browser application 10. In order to provide this functionality, the spreadsheet Web renderer 36 is operative to render script code that is executable by the Web browser application 10 into the returned Web page. The scripts may provide functionality, for instance, for allowing a user to view a larger portion of the spreadsheet, to modify pivot tables contained within the spreadsheet, to load the native version of the spreadsheet in the spreadsheet application 26, and to perform other functions.

In order to provide interactivity with the spreadsheet within the context of the Web browser application 10, the Web browser application 10 receives user input. In response to certain types of user input, the scripts may be executed. When a script is executed, a response may be transmitted to the application server 30 indicating an element within the spreadsheet that has been acted upon, to identify the type of interaction that was made, and to further identify to the Web application 34 the function that should be performed upon the appropriate element. In response to receiving such a request, the Web application may make additional requests to the calculation server 32 for an updated workbook 44. In response thereto, the spreadsheet calculation server program 40 may recalculate the workbook 44 in view of the user action and provide a spreadsheet document formatted representation of the updated workbook to the Web application 34. The spreadsheet Web renderer 36 is then operative to render the updated workbook into a format renderable by the Web browser application 10. The Web application 34 is then operative to transmit the updated spreadsheet to the computer 2 where it may be rendered by the Web browser application 10. This process may be repeated any number of times as the user interacts with the spreadsheet from within the context of the Web browser application 10. When a user is finished editing the spreadsheet within the Web browser application 10, any changes made to the spreadsheet may be propagated through any one or more of the Web application 34, the calculation server 32, and to the workbook 44 stored in the database 42. Additional details regarding these various processes, including exemplary implementations for designating, discovering and setting workbook parameters, is provided below.

Designation Discovery and Setting of Spreadsheet Document Parameters

Figure 3A:
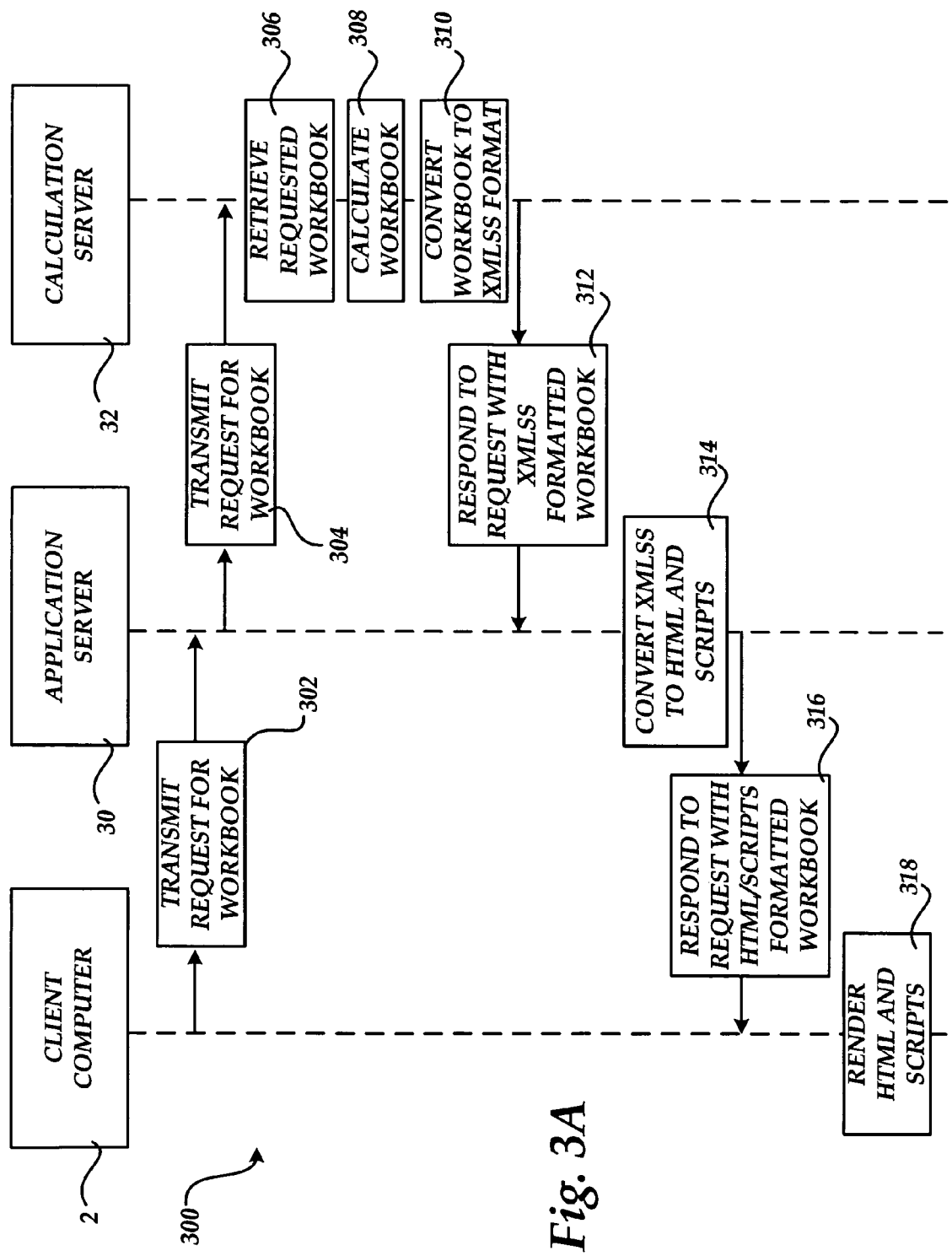
FIGS. 3A and 3B together illustrate an exemplary client and server architecture for authoring and viewing spreadsheet documents via standalone applications and Web rendering services in accordance with various implementations of the invention.
Figure 3B:
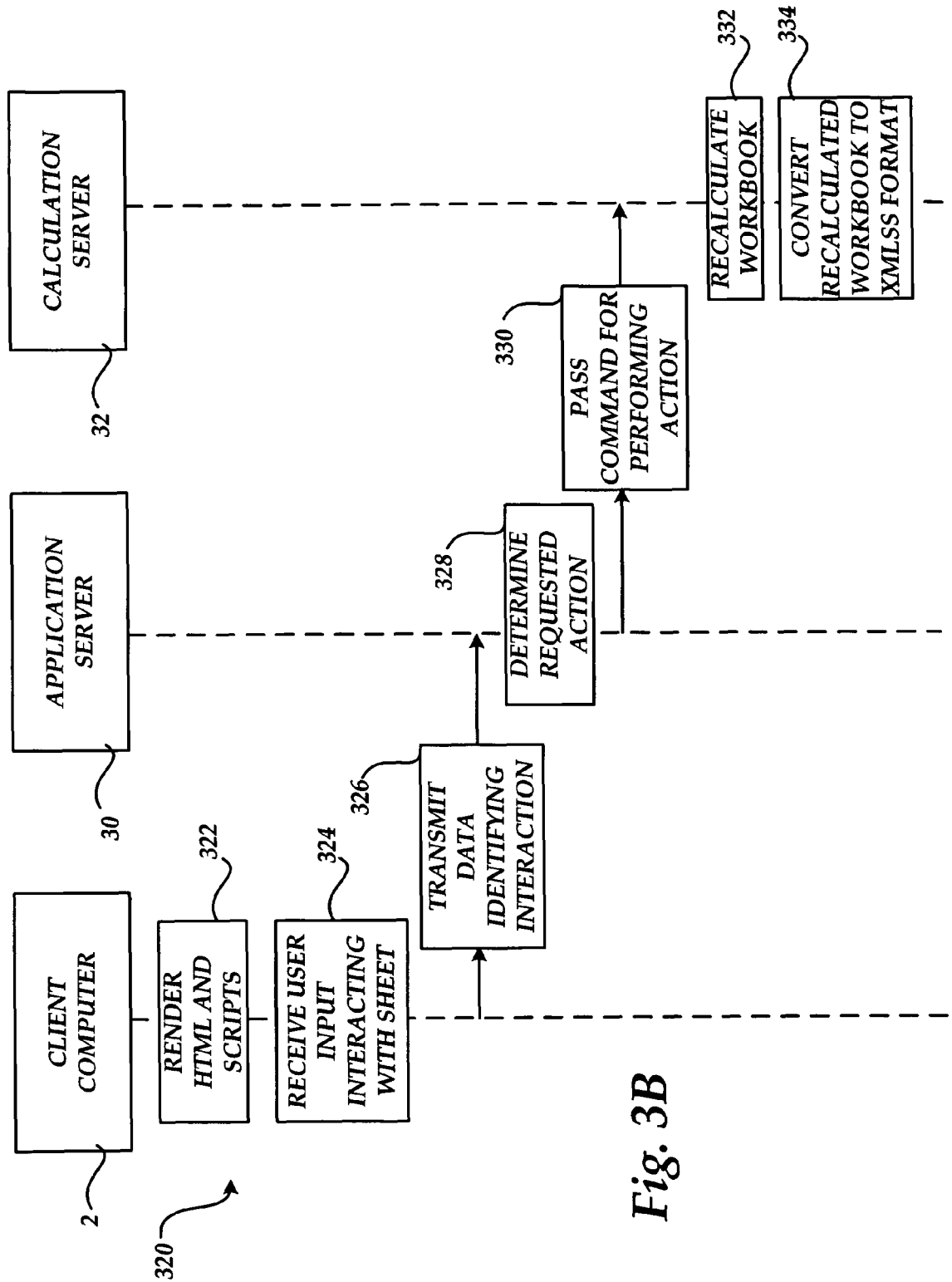

Referring now to FIGS. 3A and 3B, an illustrative routine 300 will be described illustrating a process for viewing and interacting with a spreadsheet from within the context of a Web browser application program. It should be appreciated that although the embodiments of the invention described herein are presented in the context of a Web browser application program, the invention may be utilized in other types of application programs that support the rendering of markup language documents. For instance, the embodiments of the invention described herein may be utilized within a personal information manager application program, a presentation application program, a drawing or computer-aided design application program, or a database application program in order to allow the rendering of and interaction with a document without requiring a dedicated application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 6, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 300 begins at operation 302, where the client computer 2 transmits to the application server 30 a request for the workbook 44. The request may be transmitted by the computer 2 in response to a user requesting through the Web browser application 10 that the workbook 44 be opened for viewing and editing within the Web browser application 10. It should be appreciated that the application server 30 may provide a Web based interface 30 for allowing a user to view the available workbooks and to select one of the workbooks for viewing and editing.

From operation 302, the routine 300 continues to operation 304, where the application server 30 transmits a request to the calculation server 32 for the workbook 44. In particular, the Web application 34 may utilize the server API 38 to communicate with the spreadsheet calculation server program 40. Through this communication path, a request may be made for the workbook 44.

From operation 304, the routine 300 continues to operation 306, where the spreadsheet calculation server program 40 retrieves the requested workbook 44 from the database 42. The spreadsheet calculation server program 40 then calculates the contents of the workbook 44 at operation 308. The calculation operation 308 may include calculations similar to those performed by a spreadsheet application 26 when recalculating the workbook 44.

Once the calculation server 32 has calculated the workbook 44, the spreadsheet calculation server program 40 is also operative to convert the calculated workbook to an appropriate format, such as an XML-based format. An XML, or markup based, format comprises a markup language schema for describing the contents of a spreadsheet. It should be appreciated that, according to aspects of the invention, only a portion of the workbook 44 is converted to the XML format. This allows only a displayable portion of the spreadsheet to be returned to the computer 2. Additional portions may be requested through the interface provided by the Web page 24. Alternatively, the entire workbook 44 may be converted to the XML format and returned to the application server 30.

At operation 312, the calculation server 32 responds to the request from the application server 30 with the XML formatted workbook. The routine 300 then continues to operation 314, where the spreadsheet Web renderer 36 executing on the application server 30 converts the XML formatted workbook to a format that can be rendered and displayed by the Web browser application 10. In particular, the spreadsheet Web renderer 36 converts the XML workbook to a Web page 24 that includes both HTML and scripts. The HTML is utilized by the Web browser 10 to display the contents of the requested workbook 44. The scripts are utilized by the Web browser application 10 to allow a user to interact with the rendered version of the spreadsheet within the context of the Web browser application 10.

From operation 314, the routine 300 continues to operation 316, where the application server responds to the original request from the computer 2 for the workbook 44. In particular, the application server 30 transmits the Web page 24 to the computer 2 that includes the HTML and scripts necessary to view and interact with the workbook 44 within the context of the Web browser application 10.

Once the computer 2 has received the Web page 24, the Web browser application 10 is operative to render the contents of the Web page 24. In particular, the HTML is rendered in order to provide a view of the workbook 44 that is substantially similar to that which would be provided by the spreadsheet application 26 if the same workbook 44 were opened utilizing the spreadsheet application 26. Moreover, the Web browser application 10 is operative to render the scripts so that a user of the computer 2 may interact with the spreadsheet within the context of the Web browser application 10.

Turning now to FIG. 3B, an illustrative routine 320 will be described that illustrates various aspects of the invention for allowing a user to interact with a workbook rendered within the context of the Web browser application 10. The routine 320 begins at operation 322, where the contents of the Web page 24, including the HTML necessary for displaying the Web page and the scripts necessary for allowing a user to interact with the spreadsheet are rendered. The routine 320 then continues to operation 324, where the Web browser application 10 receives user input for interacting with the displayed spreadsheet. For instance, the Web browser application 10 may receive from the user input modifying the contents of a pivot table, requesting that another spreadsheet in a workbook be displayed, for saving any modifications to the spreadsheet, or for performing other functions. It should be appreciated that one or more scripts may be executed by the Web browser application 10 to receive the input and perform the communication with the application server 30 necessary to cause the interaction to be performed.

Once input has been received from a user at operation 324, the appropriate script transmits data to the application server 30 identifying the particular action taken by the user at operation 326. At operation 328, the application server 30 determines the particular action taken by the user. Once the requested action has been identified, the application server 30 transmits to the calculation server 32 a command requesting that the particular action be taken on the specific workbook. As discussed above, the application server 30 communicates with the calculation server 32 through the server API 38.

In response to receiving the request from the application server 30 to perform a command on the current workbook, the spreadsheet calculation server program 40 performs the requested action on the workbook 44. For instance, if a user has requested that elements within a pivot table be rearranged, the spreadsheet calculation server 40 performs the actual rearrangement of the elements. Once the action has been performed, the spreadsheet calculation server program 40 recalculates the workbook at operation 332. The recalculated workbook reflects the changes made by the user to the currently open workbook through the Web browser application 10.

Once the workbook 44 has been recalculated, at 334, the calculation server 32 converts the recalculated workbook to the XML format. This process is described above with reference to FIG. 3A. Once the recalculated workbook has been converted to the XML format, the recalculated workbook is transmitted from the calculation server 32 to the application server 30. At the application server 30, the spreadsheet Web renderer 36 converts the XML version of the recalculated spreadsheet to a format renderable by the Web browser application 10. The renderable version of the recalculated spreadsheet is then transmitted to the Web browser application 10 where it may be rendered and displayed to a user. This process is described above with reference to FIG. 3A and operations 312-318. Exemplary non-limiting implementation details for the processes for designating, setting, editing and discovering workbook parameters in accordance with the invention will now be described in more detail below.

Designating, Setting, Editing and Discovery of Workbook Parameters

As described, in accordance with the invention, a workbook author can specify cells and/or filters as editable parameters. A server, e.g., a spreadsheet application server that, among other things, renders spreadsheet documents for display via a Web browser, can then expose the editable parameters through the user interface (UI) and through a web services application programming interface (API). In one aspect of the invention, a spreadsheet client may be used to author an experience for workbook parameters by allowing the designation of cells and filters as parameters.

As mentioned in the background, current Application Servers do not allow in-line editing of cell values, however, there are numerous customer scenarios for which the ability to change a specific sub-set of cell values is powerful. This includes, for example, simple well-defined calculation models (e.g., mortgage calculators), and what-if analysis (e.g., changing the growth rate on year of year revenue). Such a feature can be used both by end-users wishing to change values as part of the Application Server Web rendering experience as well as by Web Services API to discover, retrieve and set/edit specific parameter values.

The spreadsheet client application in accordance with the invention provides the user with way(s) to designate which cells are parameters. Users can then discover which cells are parameters and edit the corresponding cells. While, in one embodiment of the invention, only the server exposes parameters (wherein the parameter designation functionality of the client becomes part of publishing workbooks to the server), the present invention contemplates alternate embodiments wherein a spreadsheet client application exposes the parameters as well, i.e., allows discovery, retrieval and setting of parameters.

Herein described are techniques allowing workbook authors to specify specific cells as parameters in spreadsheet client. The Application Server, in turn, supports changing the values in these cells through either UI or OM. Such functionality may also be supported by the spreadsheet client.

There are a variety of ways to expose parameters to a user as may be appreciated by one of skill in the art. For instance, in one exemplary non-limiting embodiment, dashboards may be utilized. For instance, today dashboards, such as business intelligence (BI) dashboards, are built using various data rendering Web parts (e.g., Office Web Components (OWC), from SQL Server Reporting Services) and it is desirable to filter all the different data views in sync. This can be achieved by linking all the Web parts to a single 'parameter' value.

Spreadsheet workbooks can thus be incorporated into these dashboards in accordance with the invention so that the workbooks can drive off similar page level filters and parameters, enabling the following scenarios, each of which is exemplary and non-limiting: (1) Provide end-users with UI and OM in spreadsheet client for defining certain cells as parameters, (2) Persist the parameter information in the spreadsheet file so that Application Server can expose the parameters through UI and the web services API, (3) Design the feature UI and entry points to make it clear to the end-user that the feature is intended for spreadsheet Client/Server scenarios and (4) Enable Application Server scenarios including building BI dashboards using a filter (or slicer) Web part for driving workbook parameters through according to appropriate communications among the parts of the system. In one aspect, the invention thus provides a slicer control that provides values to parameters.

For example, suppose a company gathers data and creates spreadsheet reports based on Point of Sale data for manufacturers, Wall Street analysts, brokers and retailers and these reports are distributed via the Web as HTML files. As HTML files, these reports are completely static—there is no way to filter data, or explore the data within the report in order to find the answer to a business question. For this reason, the company generates over 1 million of these reports for their clients so that should the client want almost any imaginable report, it will be available. The result of this is that only 3-5% of the reports that companies such as these generate are used on a consistent basis, and when minor modifications are needed that these companies do not anticipate, an analyst must author and run the new report manually—an expensive and time consuming process.

With the Application Server and the spreadsheet Web Parts of the invention, such companies will be able to greatly reduce the number of reports that are generated for their clients, which will both save the company money and make it easier for clients to find the information for which they are looking. Instead of creating all of the imaginable reports that a client could want, with the invention, the company will be able to create a base set of reports that pull data from the correct data sources into spreadsheet workbooks on the server. These reports will be base reports, such as "YTD Sales," which clients will be able to easily understand instead of the multitude of reports today ("YTD Sales NW," "SW," "NE," "SE," "By Product," "By Product NW," "By Product NE," "By Product SW," "By Product SE," etc.). With simple parameterization, clients will be able to customize these reports and filter on the various dimensions in order to see the information that interests them the most. Further, if a client wants to see a drill down of a specific report, or a the "Top 10" for a specific product line, the client will be able to do so immediately within the existing report and will not have to request a new report be generated by the company.

For another exemplary use of the invention, John creates weekly sales reports for his upper management. Today, John has a workbook with connections to external data and every week he refreshes the data, and then several takes snapshots of the workbook filtered for the various regions in which they work. He then pastes these images into an email and sends the summary mail onto management.

After installing spreadsheet software of the invention, however, John re-works his workbook to make it more readable then ever. He also has a single cell that says the region at the top of his workbook. During a publish act to a spreadsheet Server, John sets certain cells to be parameters and decides to set the region cell as a workbook parameter. When the workbook loads in the Application Server, his management sees a new task pane appear that contains an editable region field. Managers can enter the different regions, click Apply and view the data and workbook updated for the region they entered.

For another example, Samantha is building a dashboard for the senior VPs in her organization and wants it to display key performance indicators (KPIs), graphs, and sheets of data all built off a single, easy to manage filter control. Samantha sets up a page with several Application Servers, some KPIs, and a filter (slicer) control. Samantha then goes through and assigns the filter control to drive filter values for the project name into the various parts on the page. This allows the managers to filter by the different projects and see all the parts on the dashboard update accordingly.

In one non-limiting embodiment, only a subset of cells can be selected to be parameters How they are selected, when and where the list of available parameters is stored, and the OM related to the parameter feature are described in more detail below.

In one embodiment, in a dialog determined by a user publishing a document, the UI for specifying workbook parameters includes two dialogs: a dialog showing the existing defined parameters in the workbook and a dialog with a list of available name references to choose for parameters (where not all cells may be selected as parameters, although as mentioned above, this need not be the case).

The dialog is initiated as part of the publish/manage server settings dialogs, and may be in any suitable form, such as a tabbed dialog, existing sort dialogs (having ordering capabilities), etc.

Upon entry, the current parameters defined in the current workbook are loaded into a list. If there are no parameters defined in the current workbook, the list is empty. In either case, no parameters are selected in the list upon first entering the dialog.

In one exemplary, non-limiting implementation, the parameter list includes any one or more of the following: (A) Name: the name of the parameter taken (by default, the list may be sorted by Name in ascending order (A-Z)), (B) Value: returns a string constant, the current value of to which the name refers, or an Error code, (C) Comment: Any comments associated with the Name and (D) Refers to: to what the Name, upon which the parameter is based, currently refers.

In one non-limiting embodiment, the parameter list functions like a standard list control. For instance, it is possible to select one or more parameters in the list by single clicking on the parameter (anywhere in the row), and multiple selections are available similar to normal list control behavior with the mouse and keyboard. For instance, a parameter can be selected (e.g., with the mouse pointer or arrow keys), the parameter can be selected in addition to any other parameters already selected, the parameter can be selected in addition to any other parameters already selected plus the parameters in between the selection and a previous selection, and parameters can be selected by click dragging with the mouse pointer.

In another non-limiting embodiment, an "Add" button or function checks to see if there is at least one valid name and launches an add parameter dialog and a "Delete" button allows the user to delete one or more parameters that were previously added. Similarly, pressing the "Delete" button when one or more parameters are selected will initiate deletion for those parameters (from the list and on save of the file). When returning from the add parameter dialog, in one exemplary non-limiting embodiment, the parameters checked are at the bottom of the list sorted according to the same order as they appeared in the add parameter dialog.

In one exemplary non-limiting embodiment, a user may order parameters by using the up and down arrow buttons and in another exemplary non-limiting embodiment, dragging and dropping if parameters may be implemented as a means of ordering parameters.

With respect to storing parameters, any conventionally known means for storing and associating the designated parameters with the workbook may be utilized. For an exemplary non-limiting implementation, workbook parameters may be stored in a document property, such as a hidden document property, and/or in the workbook file. The former allows easy extraction of the parameters by the Application Server and enables quick retrieval for setting up dashboards with slicer controls and additional solutions. Workbook parameters may be stored when saving or publishing a file.

In one exemplary non-limiting embodiment, the information that is stored for each parameter is the same as the information entered for each user, although additional information may also be stored, i.e., parameter storage formats are extensible in accordance with the invention. The following properties may also be stored for each parameter: the defined Name, and the order in which the names will appear in the Application Server UI or OM.

In exemplary, non-limiting embodiments, the ServerParameters collection of ServerParameters at the workbook level may include the following from Table I, and the ServerParameter object may include the members below in Table II:

TABLE I

ServerParameters collection of ServerParameters

| Name | Type | Params | Description |
| --- | --- | --- | --- |
| Add | Method | Name, order | Adds a Parameter to the collection. Adding will return an error if the Name selected is not a valid Parameter. |
| Item | Object | iParameters | User specifies a number and it returns the corresponding Parameter |
| Count | Property | | Read-only property that returns the number of Parameters |
| Delete | Method | Name | Deletes a Parameter from the collection. Returns an error if there are no Parameters in the collection by that name. |
| Clear Order | Method | | Removes all the Parameters. |

TABLE II

ServerParameter Object Members

| Name | Type | Description |
| --- | --- | --- |
| Name | Property | The name of the Parameter |
| Order | Property | The order of the Parameter |
| Delete | Method | Removes this Parameter from the collection |

Editing Contents of a Cell Via the Application Server

This section generally describes the ability of a user to edit the contents of a cell via the Application Server, either through a SharePoint Portal Server (SPS) filter, or an Application Server's own workbook parameter taskpane. One of ordinary skill in the art can appreciate, however, that alternate known mechanisms for editing the content of a cell may be employed in accordance with the invention, and that the following implementation details are presented for illustrative purposes.

For some background, the SPS is used for some tasks carried out by a spreadsheet server. The Application Server, as described in exemplary embodiments herein, is a Web part which, among other things, renders spreadsheet workbooks, for instance, as dynamic hypertext markup language (DHTML). The Calculation Server (CS) is the calculation engine, and generally comprises the back end components of a spreadsheet server. As described herein, a Web Front End (WFE) includes the front facing components of the spreadsheet server, including: the Application Server, application programming interfaces (APIs) and proxy.

As described in the previous section, workbook parameters in accordance with the invention include a way for a workbook author to select a subset of cells in their workbook and mark them as editable by the user. These cells may then saved in the document properties of the workbook and exposed to the end user either through a taskpane in the Application Server itself, or through an SPS filter. This section describes a variety of exemplary non-limiting implementations for those solutions.

Figure 4A:
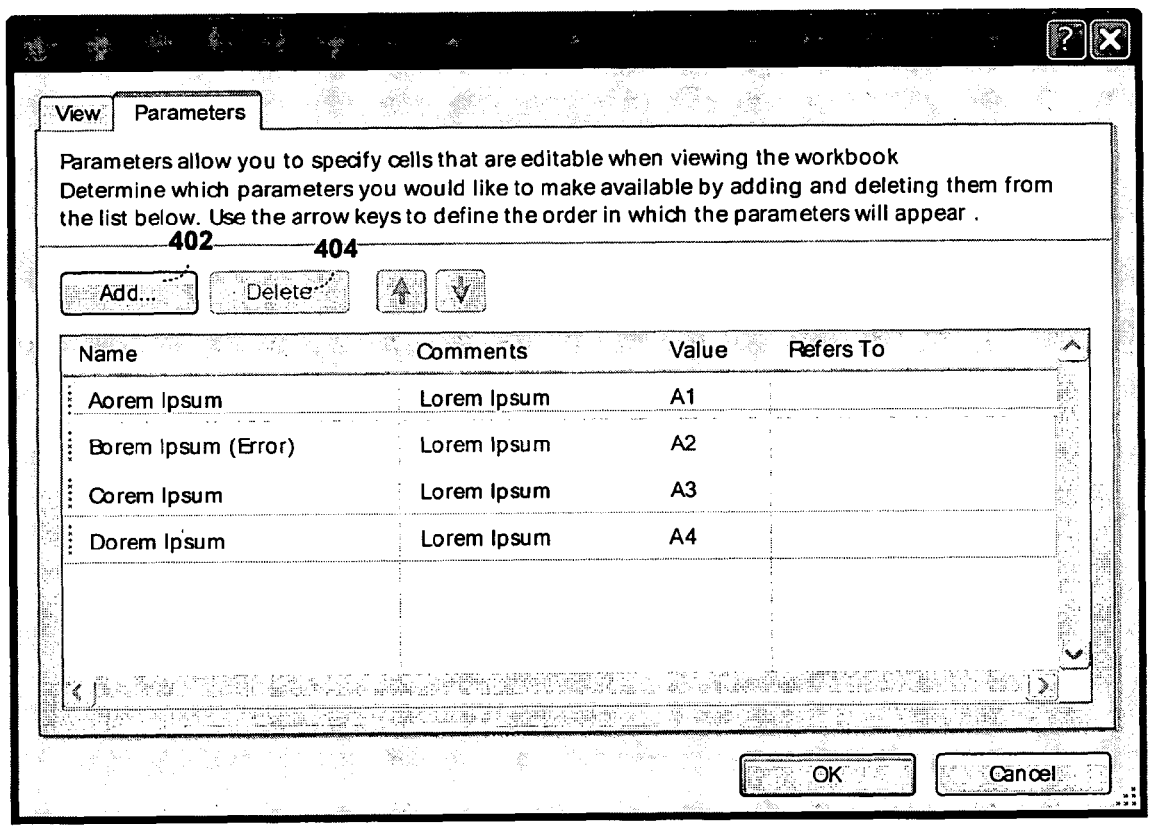
FIGS. 4A, 4B and 4C illustrate exemplary non-limiting screenshots of various aspects of designating, discovering and setting workbook parameters in accordance with the invention.

FIG. 4A illustrates an exemplary non-limiting UI screenshot illustrating the Application Server with parameters in accordance with the invention. With the invention, users are able to set parameters using the Application Server without requiring a component download.

In this regard, the invention supports a variety of parameterization scenarios so that users can complete common tasks without having to return to the spreadsheet client software. For instance, parameterization will work with an SPS slicer interface as described herein. In this respect, the invention allows users to obtain parameters out of the Application Server to drive other Web parts.

For some exemplary non-limiting scenarios that may be achieved in accordance with the Application Server of the invention, the task of building a workbook with editable cells is considered. For instance, suppose John creates weekly sales reports for his upper management. Today, John has a workbook with connections to external data and every week, he refreshes the data, and then several takes snapshots of the workbook filtered for the various regions in which they work. He then pastes these images into an email and sends the summary mail onto management.

After installing the appropriate software, however, John jumps on the Sheet Data bandwagon and re-works his workbook using Sheet Data to make it more readable then ever. He also has a single cell that says the region at the top of his workbook. During a publish to Spreadsheet server, John realizes that he can set certain cells to be parameters via the invention and decides to set the region cell as a workbook parameter. When the workbook loads in the Application Server, John is excited to see a new taskpane appear that contains an editable region field. John enters in 'South' and clicks 'Apply' and watches as the Application Server refreshes with the data all updated for the southern region. Now, John never has to send out these weekly status mails ever again.

For another scenario, the invention enables the building of a dashboard. For instance, Sam is building a dashboard for the senior VPs in his organization and wants it to display key performance indicators (KPIs), graphs, and sheets of data all built off a single, easy to manage filter control. In accordance with the present invention, Sam sets up a page with several 'naked' Application Servers, some KPIs, and an SPS Slicer control. Sam then goes through and assigns the Slicer control to take in filter values from all the various parts on the page, and assigns each of them to a single "Report" control.

Now, when a VP goes to the dashboard page and selects a report from the list, all of the sheets, graphs, and KPI indicators update to reflect the data in that report because Sam has set all the workbooks to filter based on the selected report.

In accordance with exemplary non-limiting implementations of the invention. Workbook Parameters can be saved as document properties, and the CS includes the ability to apply changes to workbook properties via a private API to the CS.

In one embodiment, the invention provides an interface that gives access via a transformer to a parameter and the values set for it in the Slicer whenever the user submits the page.

To setup a connection between the SPS Slicer and a control of the invention, in one exemplary non-limiting embodiment of the invention, the user goes into Design Mode for the page that the Application Server is on and begins dropping filter controls into the "Filter web part zone". The user can then click on an arrow in the top right of the control, and in this dropdown, they will choose Connections, and the flyout menu from Connection includes a "Get Filter Values From" option, which again causes a flyout to {SpreadsheetWebRenderer}.

After the user selects the Application Server, they are prompted to select from a list of unassigned parameters that the Application Server is exposing, or, if they attempted to setup a connection from a multi-valued filter control, they receive a message telling them that the Application Server is not exposing any multi-valued parameters, and they will not be able to setup a connection to the Application Server using that filter control. Assuming that they were attempting to setup a connection from a single-valued control, the user will then select a parameter from the list, and the control is then considered setup. In one non-limiting embodiment, if a parameter is connected to a filter control, and the Workbook Parameters taskpane is visible, it becomes disabled in the taskpane.

In one non-limiting embodiment, single cell parameters accept a single value from the Slicer, and that is why for every parameter, the invention passes a 'SupportsSingleValue' flag to the Slicer. This means that the Slicer will only allow the user to setup connections from single valued filter elements to single celled parameters.

In one exemplary non-limiting embodiment, values are sent to the CS as name-value pairs, so that not all parameters need be sent to the CS and the order of them does not matter. Appropriate error handling may be applied in accordance with the invention in the event of a malfunction.

In exemplary non-limiting embodiments of the invention, an Expand/Collapse Bar is provides aside, e.g., sits to the left or right, of the Workbook Parameters taskpane, but to the right or left of the sheet (respectively) and allows the user to hide or show the taskpane. The toolbar may be placed above both the Expand/Collapse Bar and the Workbook Parameters taskpane.

The Expand/Collapse Bar includes an image that depends on whether the taskpane is collapsed or expanded and the image is centered both vertically and horizontally. In exemplary non-limiting embodiments, the images used are as follows:

Clicking on the Expand/Collapse bar when the taskpane is visible hides it and moves the Expand/Collapse bar over to the far right edge (or left edge in right to left (RTL) mode) of the Application Server, and the grid and sheet navigation bar grow in width along with it. Clicking on the Expand/Collapse bar when the taskpane is hidden reveals it and moves the Expand/Collapse bar out with it, and shrinks the width of the grid and the sheet navigation bar.

The user should also be able to tab to the Expand/Collapse bar and operate it using the ENTER key.

The state of the taskpane, be it is collapsed or expanded, is preserved through postbacks to the CS. Thus, if the user collapses the taskpane and then performs an action that requires a postback to the CS, when the page reloads, the taskpane should remain collapsed.

In one exemplary non-limiting embodiment, the Workbook Parameters taskpane starts visible and to the right (left in RTL mode) of all controls in the Application Server, except for the toolbar (where it is positioned underneath).

The parameters to display, and what to display in the corresponding textbox, are passed to the Application Server by the CS. In various non-limiting embodiments, in the body of the Workbook Parameters taskpane are the named range names and the textboxes in which the user can enter the data.

Figure 4B:
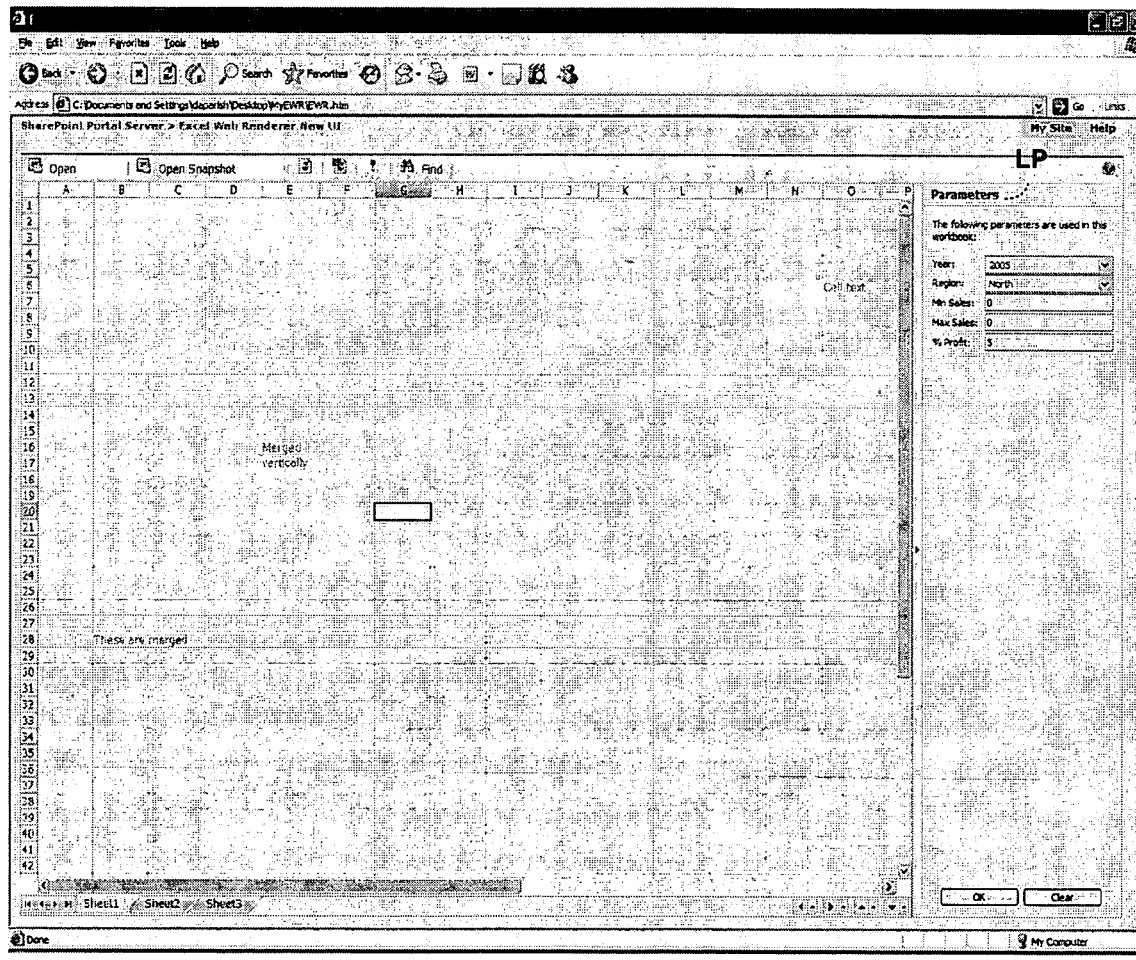

For illustrative purposes, an exemplary implementation of the UI for the taskpane is illustrated in FIG. 4B. When a user first opens the Application Server, if there are parameters for this workbook and the Workbook Parameters taskpane is not disabled via the Web part properties, then the Workbook Parameters taskpane starts visible. In one embodiment, the parameters are displayed in the same order in the Workbook Parameters taskpane as the order in which they are passed to the Application Server by the CS.

Figure 4C:
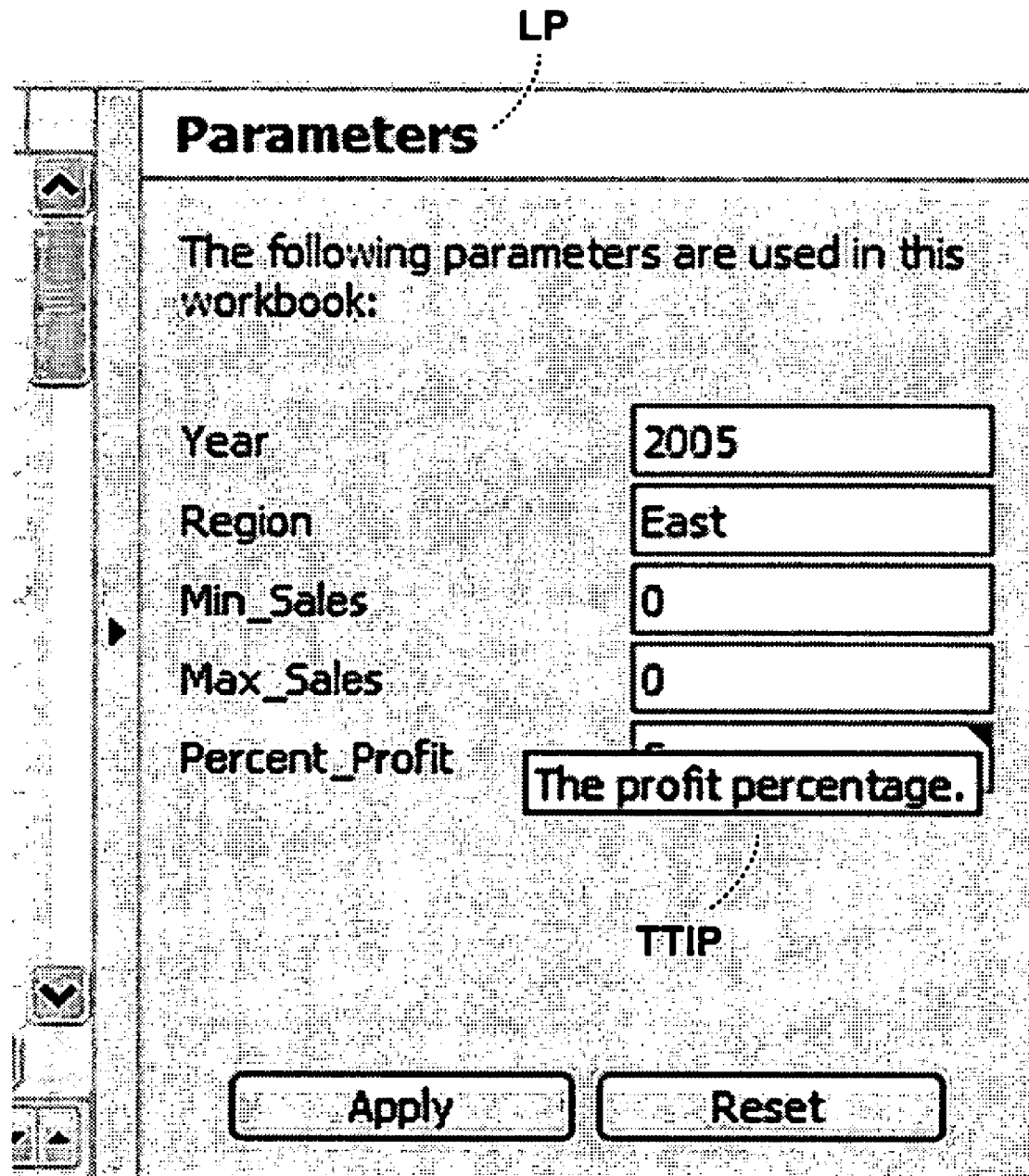

In other embodiments, the description property is shown as a tooltip TTIP when the user hovers over an icon of the textbox, as shown in FIG. 4C. The icon used may be the same as that used in the Spreadsheet to indicate to the user that there is a comment for that cell. Since the Description property is optional, if no Description value is provided, then this icon is not shown, and no tooltip will be shown. The mouse cursor may optionally remain a pointer when overtop of this image.

If there are more parameters than can fit in the taskpane, in one embodiment of the invention, a scrollbar appears that covers just the section of the taskpane that contains the parameters and their values. If the user is viewing a workbook with parameters in the viewer page, the taskpane will be visible. The user can hide or show this taskpane using the Expand/Collapse Bar. The information bar has two states: one when the page is in Design Mode, and another for when the page is in View mode.

Another type of parameter that can be supported by the present invention is a PivotTable Page Field, which can accept multiple values.

Operation of Calculation Server and Interaction with the Application Server

As described above, in accordance with the invention, a Spreadsheet Server includes the capability for workbooks to be parameterized. Calling applications via the Application Server includes the ability to request a list of parameters and set their values. As described above, the Application Server includes a Web renderer for rendering workbooks via the Web. In this regard, parameters enable workbook authors to create a single template spreadsheet that can quickly change its contents based on the value of a single or multiple parameters.

For example, a workbook author designs a mortgage calculator and creates interest rate, principal, and down payment parameters. The user applies the parameters and the cells calculate and return the appropriate results. Parameters also allow the Application Server to participate in business intelligence (BI) Dashboard scenarios in which a single web page consists of multiple web parts that can all be in synch based on the value of a slicer.

A BI Dashboard is a tool to communicate status and drive action and frequently are a mix of quantitative information presented as reports, charts, metrics and key performance indicators and qualitative analysis presented as the dashboard author's comments on the quantitative data provided.

A workbook parameter is a variable associated with a workbook that can be discovered and set by calling the Application Server. Internally, a parameter is a single-cell named range that has been "tagged" as a parameter.

One of the capabilities of dashboards is that they can be filtered or sliced based on the value of a parameter (using the slicer web part). For workbooks that are being rendered in an Application Server that are part of a BI Dashboard, the Application Server should "update" to reflect the parameter that has been assigned to the BI Dashboard.

In order to accomplish this, a mechanism is provided in accordance with the invention for Web parts to communicate what parameter(s) they contain and a mechanism for setting their value(s).

For the Spreadsheet Server to participate in this scenario, when a user changes a parameter, e.g. in a Sharepoint slicer part, the Spreadsheet workbook displayed in the Application Server reflects the value of the slicer(s).

As described herein, calling applications (Application Server) can ask the server for the list of parameters associated with a workbook. In an exemplary embodiment, even though setting a parameter value is effectively equivalent to setting the value of a cell, error messages are provided for the user that convey that a parameter operation failed and not that setting a cell value failed.

In another aspect of the invention, workbook operations related to setting parameters are optimized. For example, calculation is suspended regardless of the calculation mode until all parameter values have been set. Additionally, the invention ensures that the definition of the parameter (e.g., named range) still meets the requirements for being a parameter when the workbook is loaded. Additionally, calling applications (Application Server) can set the value (single) of a parameter.

Consumers of these dashboards will navigate to the dashboard and be able to change the "project" parameter in the parameter web part. Once the project parameter is changed, all of the web parts on the page (including the Application Server's and Reporting Services Rendering web parts) update to reflect the data associated with the project that the dashboard consumer selected. For the Application Server, sheet data formulas can be used that take the value of the parameter cell as an input to the functions.

A mortgage calculator requires several parameters to be input in order to determine the monthly payment. In this scenario, someone authors a workbook and creates named ranges for principal, interest rate, loan period, and down payment. The user then hits the apply button, and the workbook is calculated showing them their monthly payment.

With respect to retrieving parameter information, the calculation server (CS) provides a means for calling applications to retrieve parameter information, including any one or more of the following: Parameter name, the order of the parameter in the workbook (in order for the Application Server to list them in the provided order), Current value of the parameter and Parameter description.

The parameter's name is the name of the named range that it occupies. The Parameter order is defines the parameter order for display purposes, and may be defined in a variety of ways and formats. The CS can return this information to calling applications (Application Server). In addition to the current value of the parameter, each parameter has an optional description that the CS can pass to the calling application (Application Server) as well.

The CS provides a means for the Application Server to set parameter value(s) for each parameter in the workbook. In a single call to the CS, one or more parameters values can be set. As mentioned, in one aspect of the invention, calculation may be suspended until all parameter values are set that are part of a post back. Setting values for parameters is equivalent to setting the value in the cell via a SetCell( ) method.

Optionally, the CS will not implicitly or explicitly change number formats on the server based on the parameter's value.

With respect to suspending calculation and data refresh when a workbook is opened, the CS of the invention supports the ability to set cell values before the workbook is calculated or data is refreshed, regardless of the workbook's calculation mode or data refresh settings. Once the parameters are set, the workbook returns the calculation mode in which it was authored.

In one embodiment, the Application Server passes parameters as part of workbook open when there are slicers on the page that have default values. Otherwise, the Application Server will not pass parameter values as part of its request to open the workbook.

If the workbook is in manual calculation mode, this means that the workbook potentially will be in a "dirty" calculation state, from which state the user may initiate calculation in order to see the changes in the workbook due to the parameter values being changed.

It is not a requirement for all workbook parameters to be set as a result of a parameter setting operation by the Application Server. This could occur if the slicer part on the web page maps to a subset of parameters defined in the workbook. In this case, the additional parameters in the workbook maintain their default cell values.

In exemplary non-limiting embodiments of the invention, when a workbook is loaded by the CS, the CS checks if the parameters defined in the workbook still meet the criteria defined for being parameters. If this condition is not met, the CS returns an error. This check covers all parameters in the workbook, not just the parameters the Application Server attempted to set. It can be appreciated that the criteria for being a parameter may be variously set based on desired characteristics of the system, e.g., balancing system certainty of what a parameter is, and user flexibility in setting parameters.

With respect to the setting and retrieving of parameters by the calculation engine of the CS, the setting of a parameter changes the value in a cell, and depending on the calculation mode the workbook is in (manual, automatic), the workbook either calculates or does not calculate.

Exemplary Non-Limiting Screenshot Sequence

FIGS. 5A to 5K illustrate an exemplary sequence of illustrative (non-limiting) UI screenshots that show the power of the invention in connection with a web publishing experience respecting a workbook that forecasts sales based on variable called growth (e.g., interest rate of a bank account).

Figure 5A:
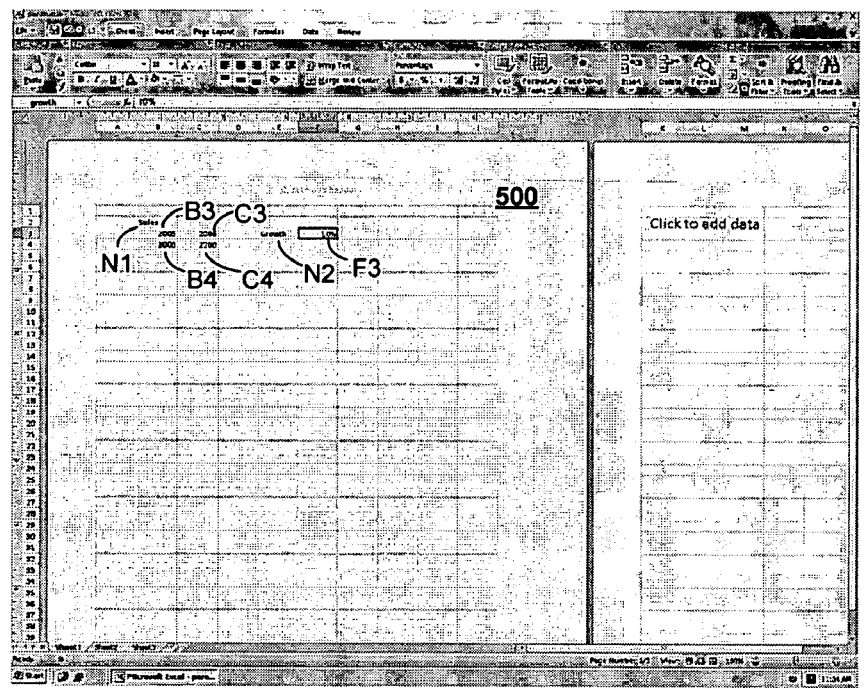
Figure 5B:
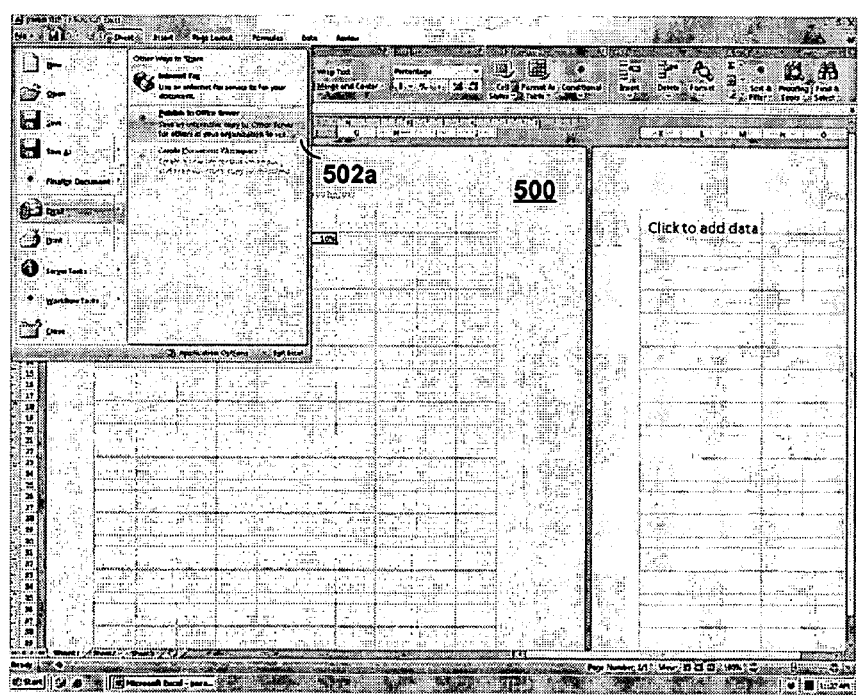

In FIG. 5A, workbook 500 includes cells B3 and B4 that label "2005" sales and provide a value $2000 for 2005 sales, respectively. Cells C3 and C4 are cells that, respectively, label "2006" sales, and forecast a value $2200 based on the growth rate named "growth" N2 having value 10% as shown in cell F3. Cells B3, C3, B4 and C4 are collectively named "Sales" as indicated by N1.

Once workbook 500 has been created, as described above, FIG. 5B begins, via dialog/menu 502a, to illustrate a process by which the user may publish the workbook to a spreadsheet server, from where further authorized users may view the workbook via a network, such as the Web, via an application, such as a browser. As illustrated, the user may select an option at 502a that publishes the workbook 500 to a Web server.

Figures 5C, 5D:
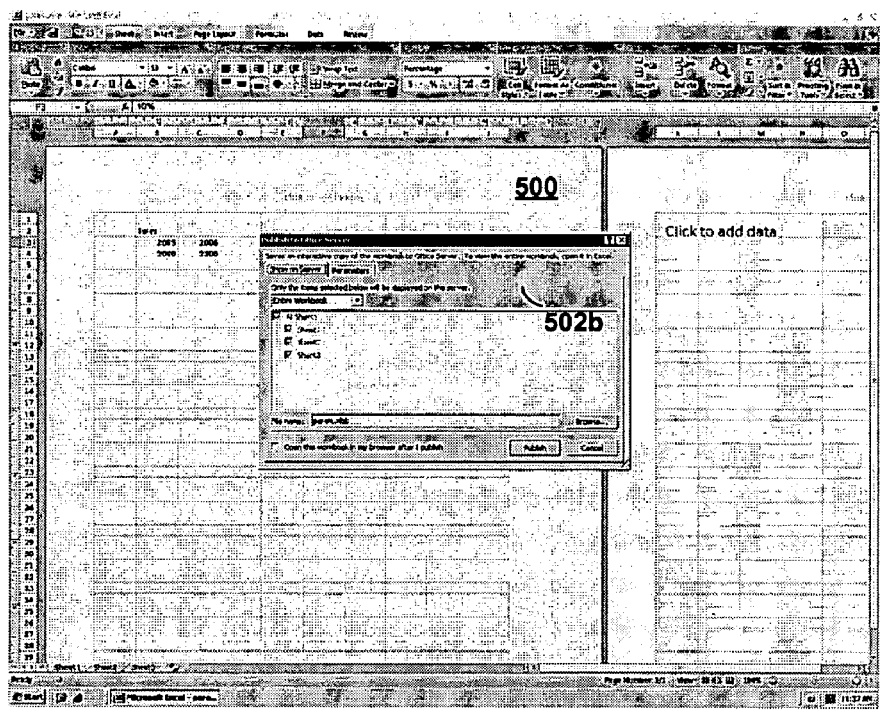

Once initiated, the flow moves to FIG. 5C wherein dialog/menu 502b illustrates that a user may choose to publish a subset of the workbook, i.e., make it such that a portion of the workbook 500, such as a particular worksheet, is inaccessible from the Web once the workbook 500 is published. For instance, it may be undesirable from the workbook author's standpoint to share a proprietary formula located on worksheet3, but at the same time, the workbook author may wish to expose one or more parameters from worksheet3 to the user.

Figure 5E:
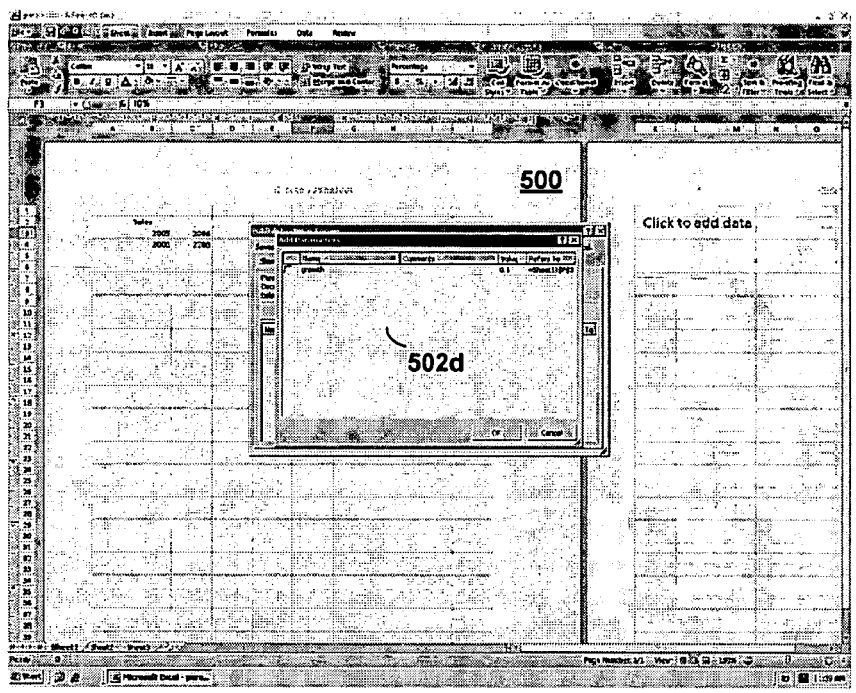
Figure 5F:
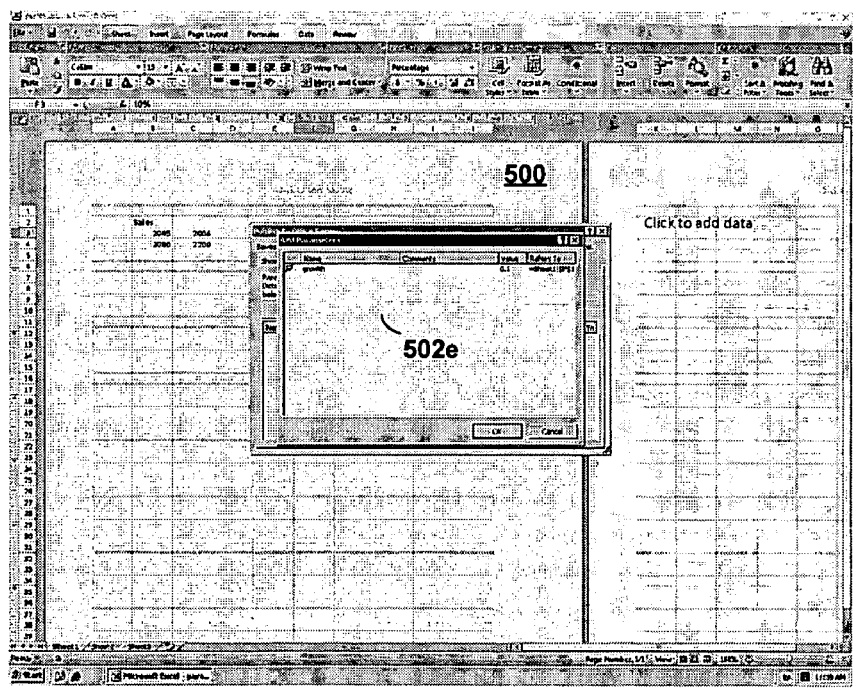

Then, as shown in FIG. 5D, a user at 502c may select the parameters tab of the dialog menu, which brings up a UI for selecting (designating) cells of workbook 500 as parameters. Optionally, initially at 502d as shown in FIG. 5E, the UI includes all possible parameters for workbook 500 in accordance with how parameters may be defined. Then, for instance, as shown in FIG. 5F and in accordance with the growth model, the user at 502e has selected "growth" as a parameter. While growth is the only parameter in this example, this is for simplicity of understanding. One of ordinary skill in the art may appreciate that spreadsheet models and formulas, and associated assumptions, can get extremely complicated, and may therefore implicate dozens or more parameters.

Figure 5G:
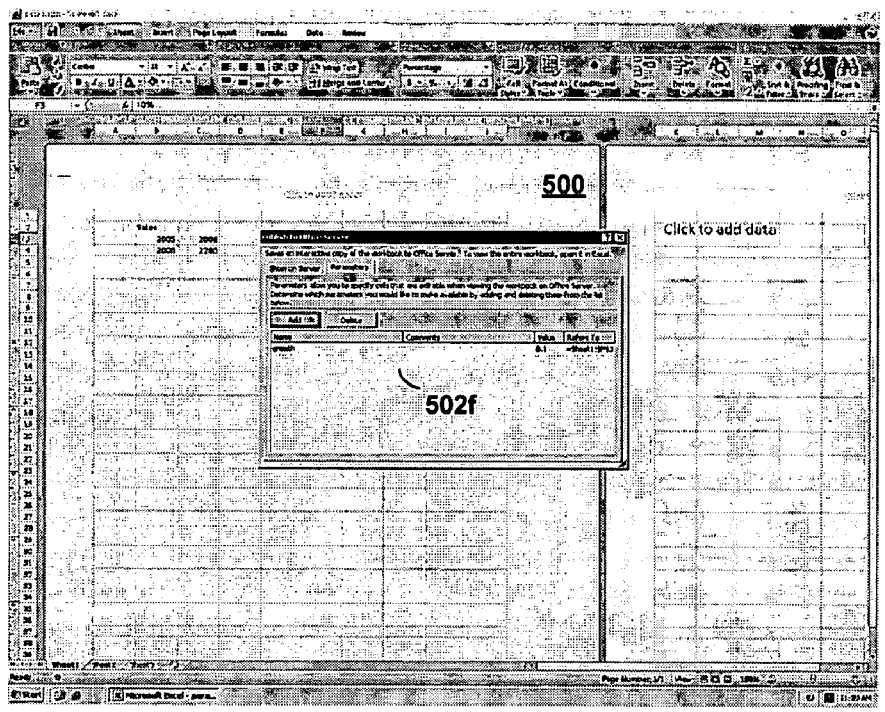
Figure 5H:
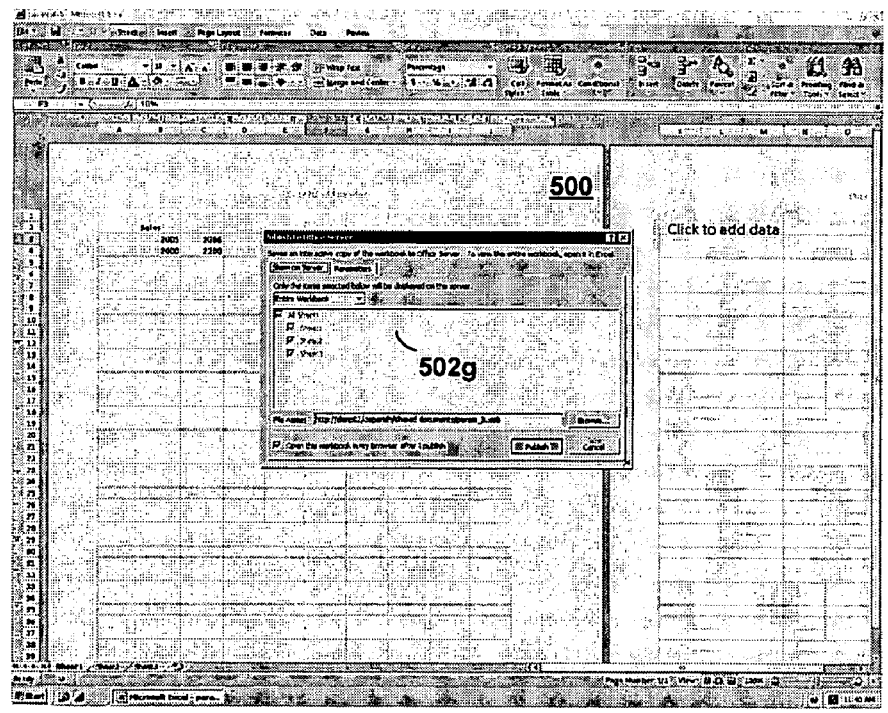
Figures 5I, 5J:
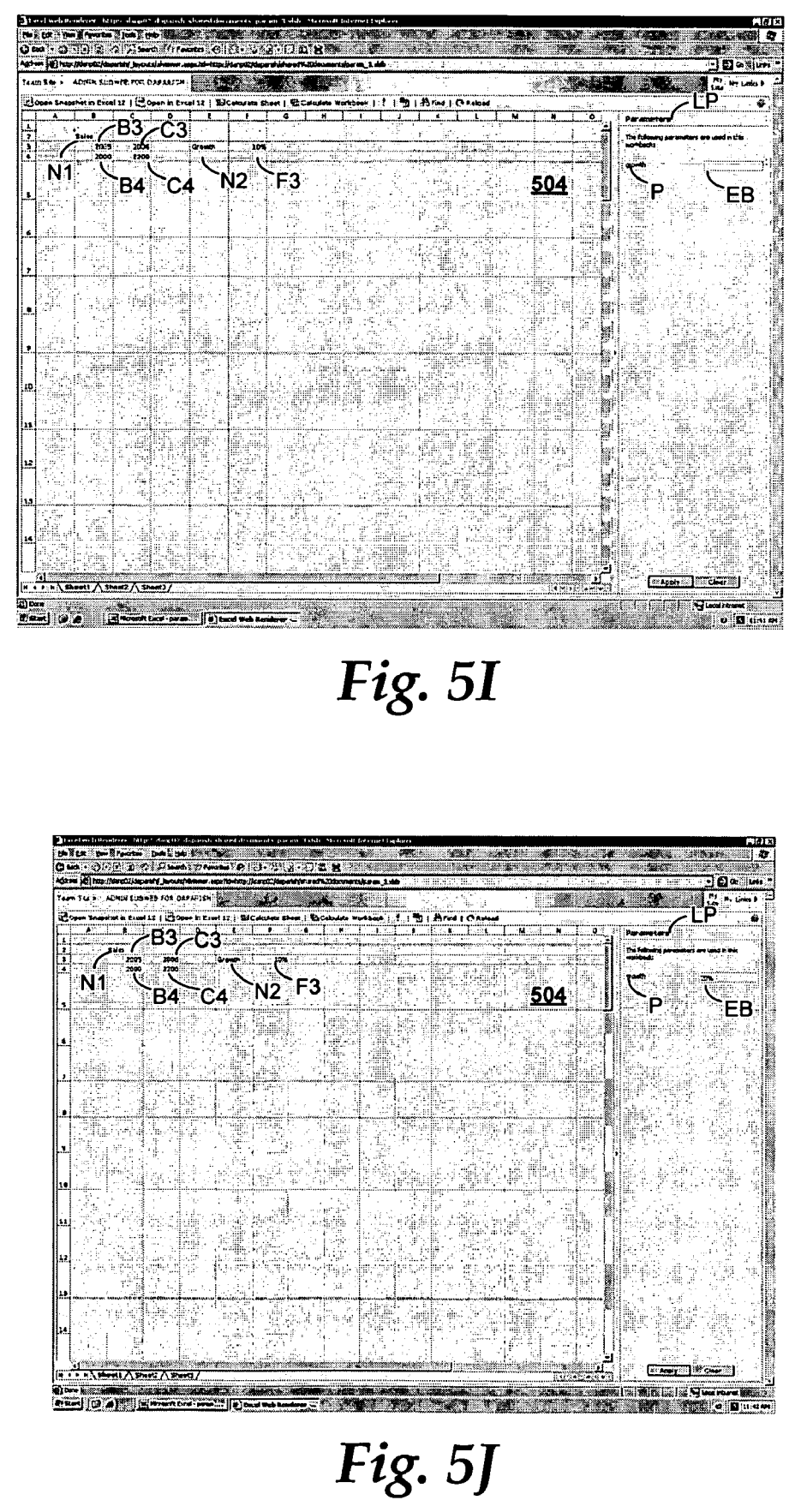

Having selected growth as a parameter at 502e, as shown at 502f of FIG. 5G, the user is returned to the main publishing UI wherein growth is shown as having been designated as a parameter. Finally, as shown in FIG. 5H, at 502g, the user publishes the document to the spreadsheet server by engaging a corresponding "Publish" UI element. Having selected an option to display the workbook via the Web, the workbook 500 created via the client application is displayed as a Web workbook 504, as shown in FIG. 5I. One can see that a list of parameters LP is displayed to the right of the workbook 504, which includes growth parameter P, and an edit box EB. As mentioned earlier, in one embodiment, the calculation and display of workbook 504 may be delayed, or suspended, until a parameter value for edit box EB is input and applied. In the non-limiting screenshot shown in FIG. 5I, the values set forth in the creation of workbook 500 are displayed by default.

Figure 5K:
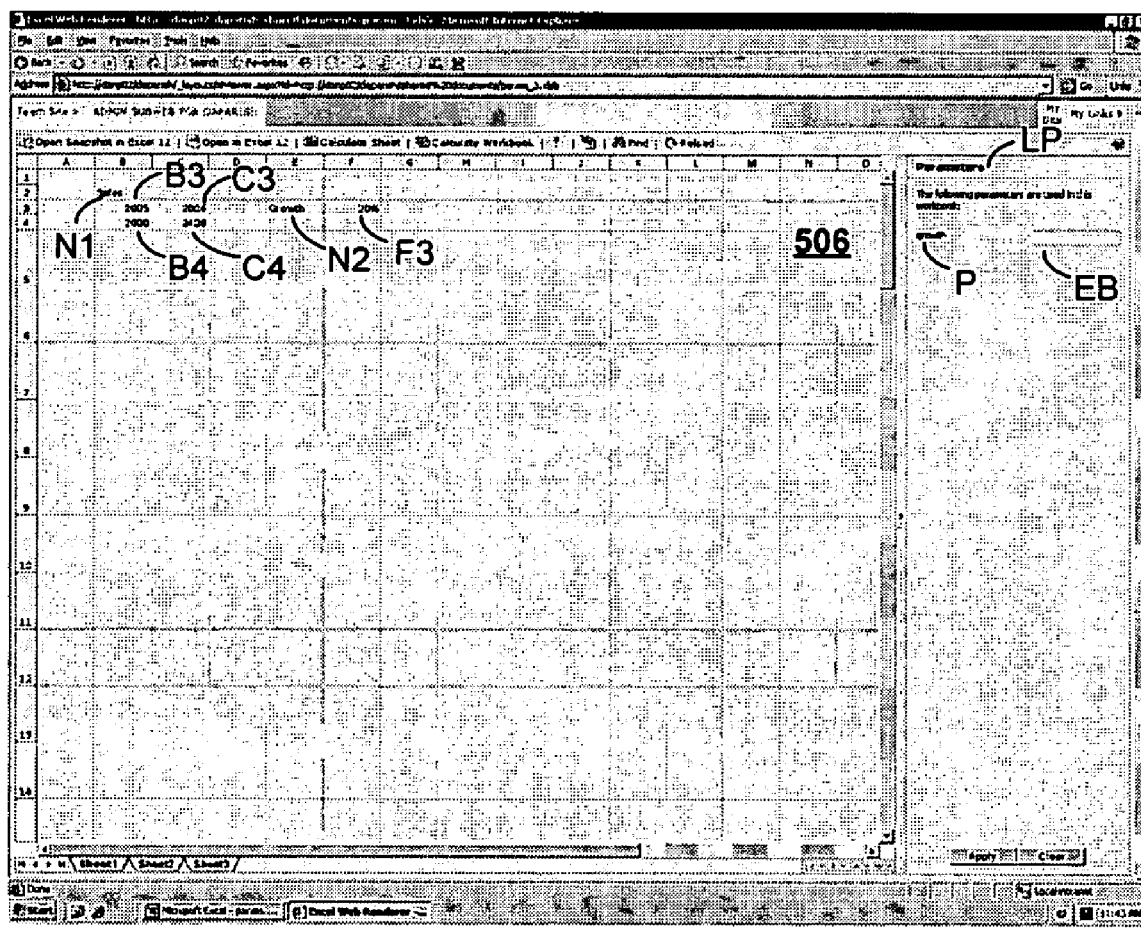

Next, in FIG. 5J, a user has entered a new value in the edit box EB of 20% (instead of the 10% currently used in the calculation and display of FIG. 5I). Lastly, the user applies the new value entered in edit box EB, and as shown in FIG. 5K, the calculation server recalculates the model based on the new parameter value of 20%, and workbook 506 is displayed after appropriate conversions for displaying Web-based documents are performed. One can see in this case that the projected 2006 value has changed to $2400 from $2200 based on a change of growth rate from 10% to 20%. One can thus see the advantage of publishing a spreadsheet document to a server, and exposing parameters to individuals based on their needs. For example, a mortgage company might wish to publish a net worth calculator wherein a variety of parameters (home value, stock value, retirement accounts, etc.) may all be entered in as parameters and thus individually tailor a calculation for a user. At the same time, the mortgage company may collect such data from its users and better tailor its overall services offerings for the user.

While the designation of parameters is described in some embodiments herein as being included in a publishing experience, a standalone client application also benefits from the designation of parameters in accordance with the invention. Accordingly, the invention should not be considered to be limited to a scenario of publishing a workbook to the Web, but instead should be considered to be defined within the scope of the claims.

Figure 6:
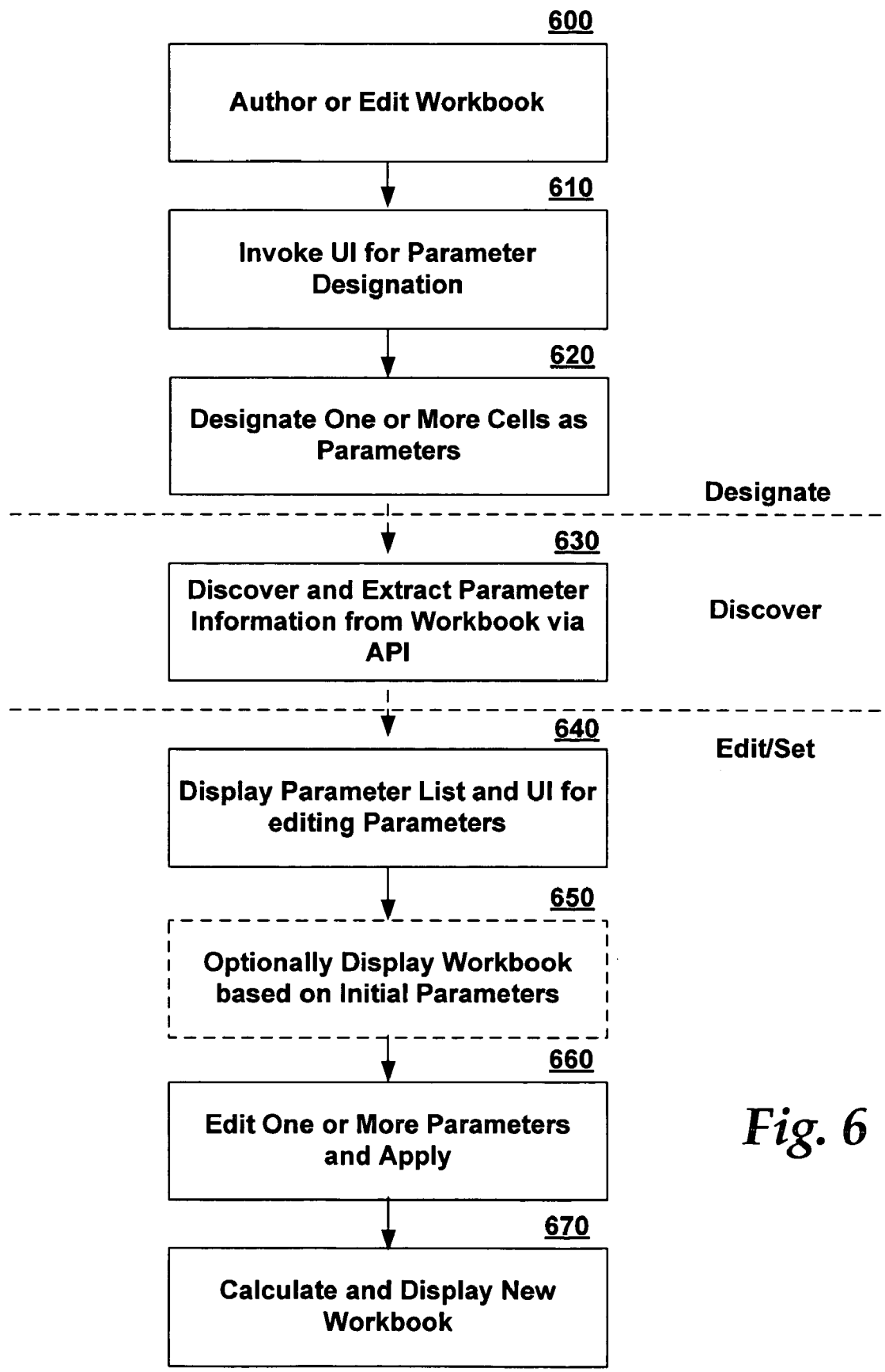
FIG. 6 illustrates an exemplary flow diagram illustrating how a user may designate, discover and edit parameters in accordance with the invention.

FIG. 6 represents a flow diagram similar to the foregoing sequence, but without certain limiting details. For instance, at 600, a user chooses to author or edit a workbook, and at 610, the user invokes a user interface component for designating parameters of the workbook, which may be done at step 620. Optionally, the workbook may be published to a spreadsheet document Web server for rendering spreadsheet documents via the Web. In the future, whether the spreadsheet document including the designated parameters is opened by the client or viewed via a Web renderer, a private API operates at 630 to discover and extract parameter information from the spreadsheet document, including a list of parameters that parameterize the underlying model represented by the spreadsheet document. Then, the document is ready for display at 640, wherein the parameter list is exposed and a user interface component is presented for editing parameters in the parameter list. Then, optionally, at 650, the workbook may itself be displayed via calculations based on an initial set of values for the parameters defining the workbook, or alternatively, as described above, such calculation can be suspended until all current information associated with the spreadsheet document is received. At 660, a user may edit on or more of the parameters in the parameter list, and request application of the new parameter values to the model of the spreadsheet. Accordingly, at 670, the calculation engine recalculates (or calculates if suspended) the spreadsheet document based on the new parameter values entered by the user.

Exemplary Interface Implementations

For any exchange of data among multiple computers, such as parameter data according to the techniques of the invention and shared between two computers, there are interfaces for handling the various operations on each computer that can be implemented in hardware and/or software and which operate to receive, send and/or process the data in some fashion, according to the relevant applications and services being requested or provided. To the extent that one or more interface objects may be provided to achieve or implement any portion of the systems and methods for compressing and decompressing markup data in accordance with the invention, the invention is intended to encompass all such embodiments, and thus a general description of the kinds of interfaces that might be provided or utilized when implementing or carrying out the invention follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 7A:
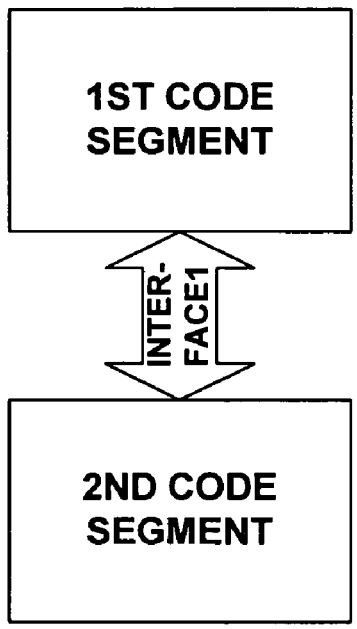
FIGS. 7A, 7B, 8A, 8B, 9A, 9B, 10A, 10B, 11A, 11B, 12A and 12B illustrate exemplary ways in which similar interface code can be provided to achieve similar or equivalent objective(s) of any interface(s) in accordance with the invention.
Figure 7B:
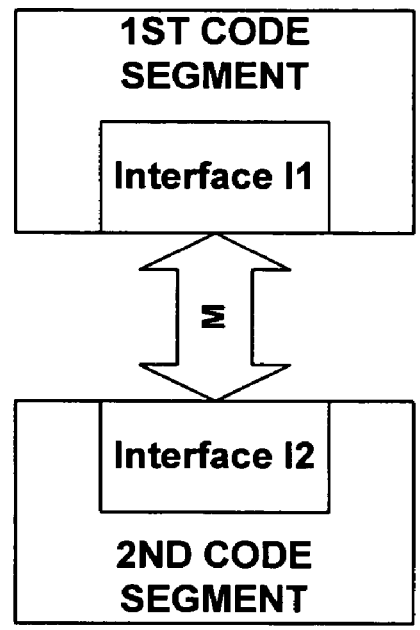

Notionally, a programming interface may be viewed generically, as shown in FIG. 7A or FIG. 7B. FIG. 7A illustrates an interface Interface1 as a conduit through which first and second code segments communicate. FIG. 7B illustrates an interface as comprising interface objects I1 and I2 (which may or may not be part of the first and second code segments), which enable first and second code segments of a system to communicate via medium M. In the view of FIG. 7B, one may consider interface objects I1 and I2 as separate interfaces of the same system and one may also consider that objects I1 and I2 plus medium M comprise the interface. Although FIGS. 7A and 7B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 7A and 7B, but they nonetheless perform a similar function to accomplish the same overall result. We will now briefly describe some illustrative alternative implementations of a programming interface.

A. Factoring

Figure 8A:
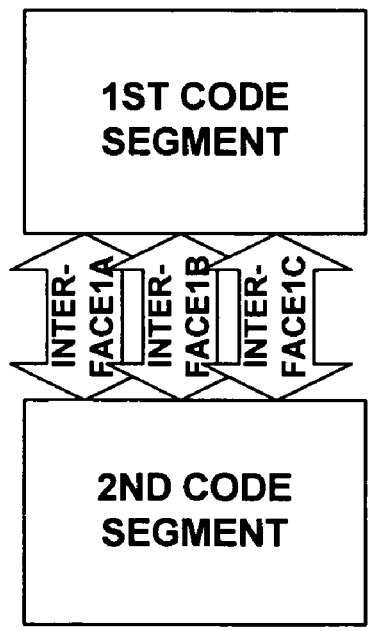
Figure 8B:
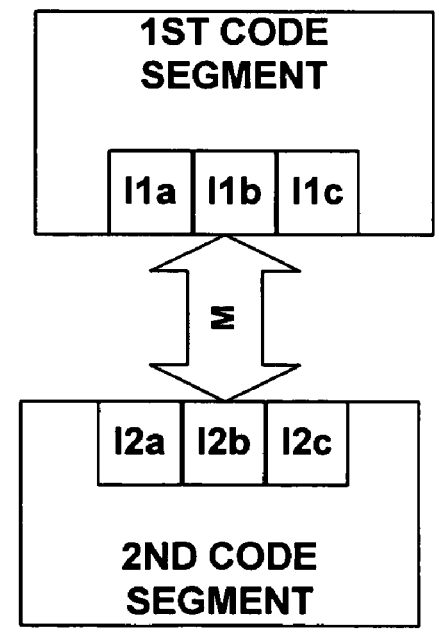

A communication from one code segment to another may be accomplished indirectly by breaking the communication into multiple discrete communications. This is depicted schematically in FIGS. 8A and 8B. As shown, some interfaces can be described in terms of divisible sets of functionality. Thus, the interface functionality of FIGS. 7A and 7B may be factored to achieve the same result, just as one may mathematically provide 24, or 2 times 2 time 3 times 2. Accordingly, as illustrated in FIG. 8A, the function provided by interface Interface1 may be subdivided to convert the communications of the interface into multiple interfaces Interface 1A, Interface 1B, Interface 1C, etc. while achieving the same result. As illustrated in FIG. 8B, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 8A and 8B, the functional spirit of interfaces Interface1 and I1 remain the same as with FIGS. 7A and 7B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 9A:
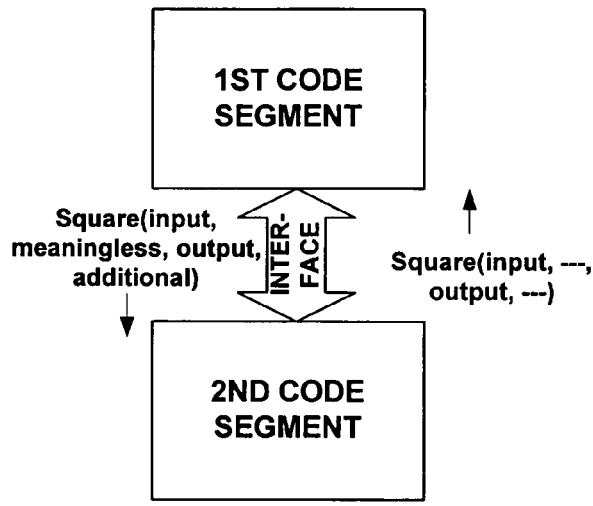
Figure 9B:
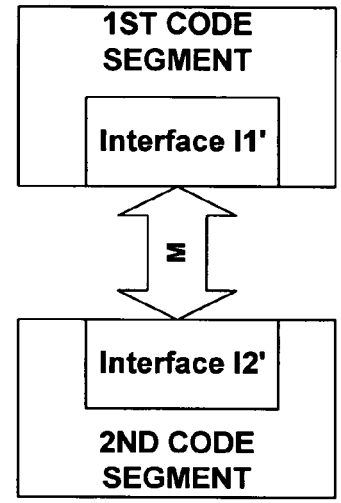

In some cases, it may be possible to ignore, add or redefine certain aspects (e.g., parameters) of a programming interface while still accomplishing the intended result. This is illustrated in FIGS. 9A and 9B. For example, assume interface Interface1 of FIG. 7A includes a function call Square (input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 9A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 9B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 10A:
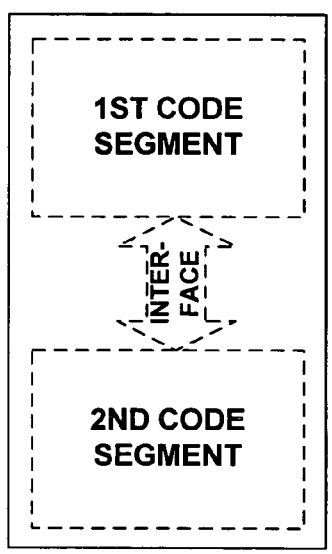
Figure 10B:
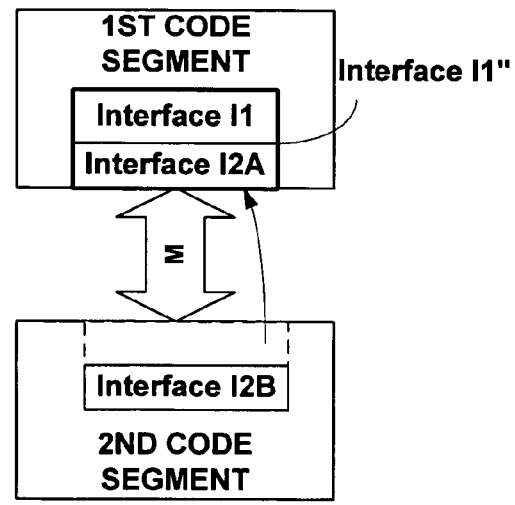

It may also be feasible to merge some or all of the functionality of two separate code modules such that the "interface" between them changes form. For example, the functionality of FIGS. 7A and 7B may be converted to the functionality of FIGS. 10A and 10B, respectively. In FIG. 10A, the previous $1^{st}$ and $2^{nd}$ Code Segments of FIG. 7A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 10B, part (or all) of interface I2 from FIG. 7B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 7B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 11A:
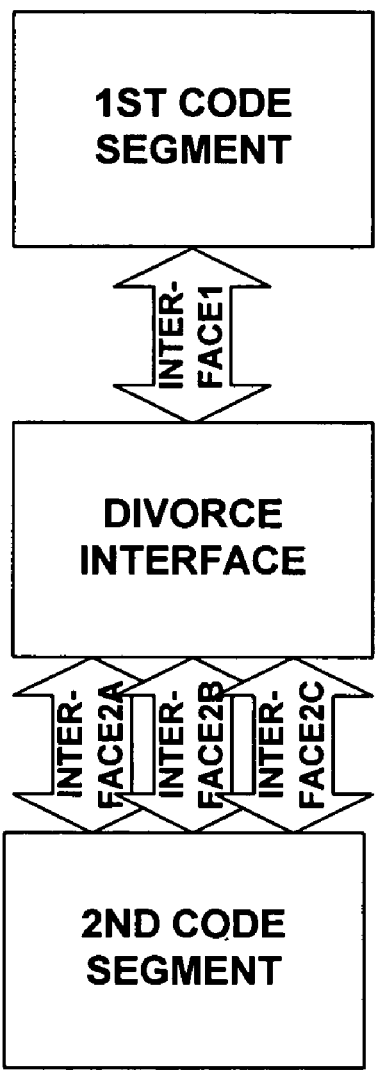
Figure 11B:
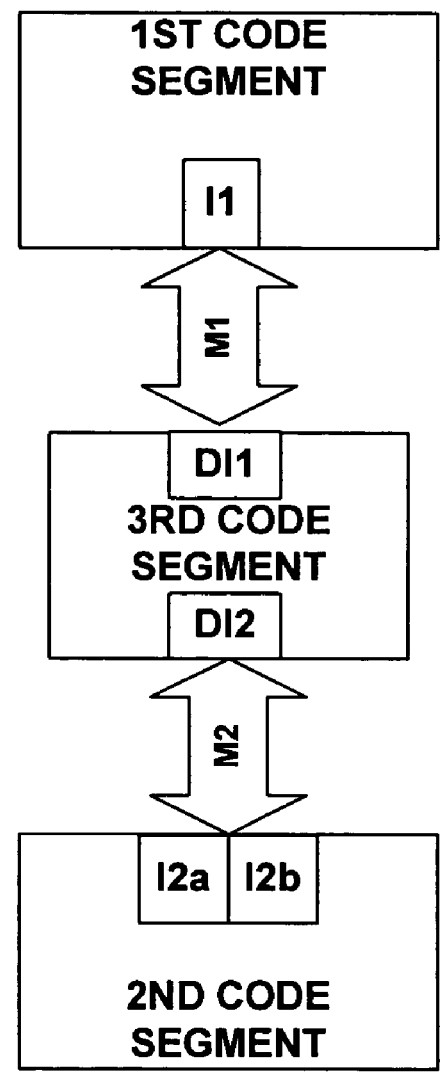

A communication from one code segment to another may be accomplished indirectly by breaking the communication into multiple discrete communications. This is depicted schematically in FIGS. 11A and 11B. As shown in FIG. 11A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 11B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 7B to a new operating system, while providing the same or similar functional result.

E. Rewriting

Figure 12A:
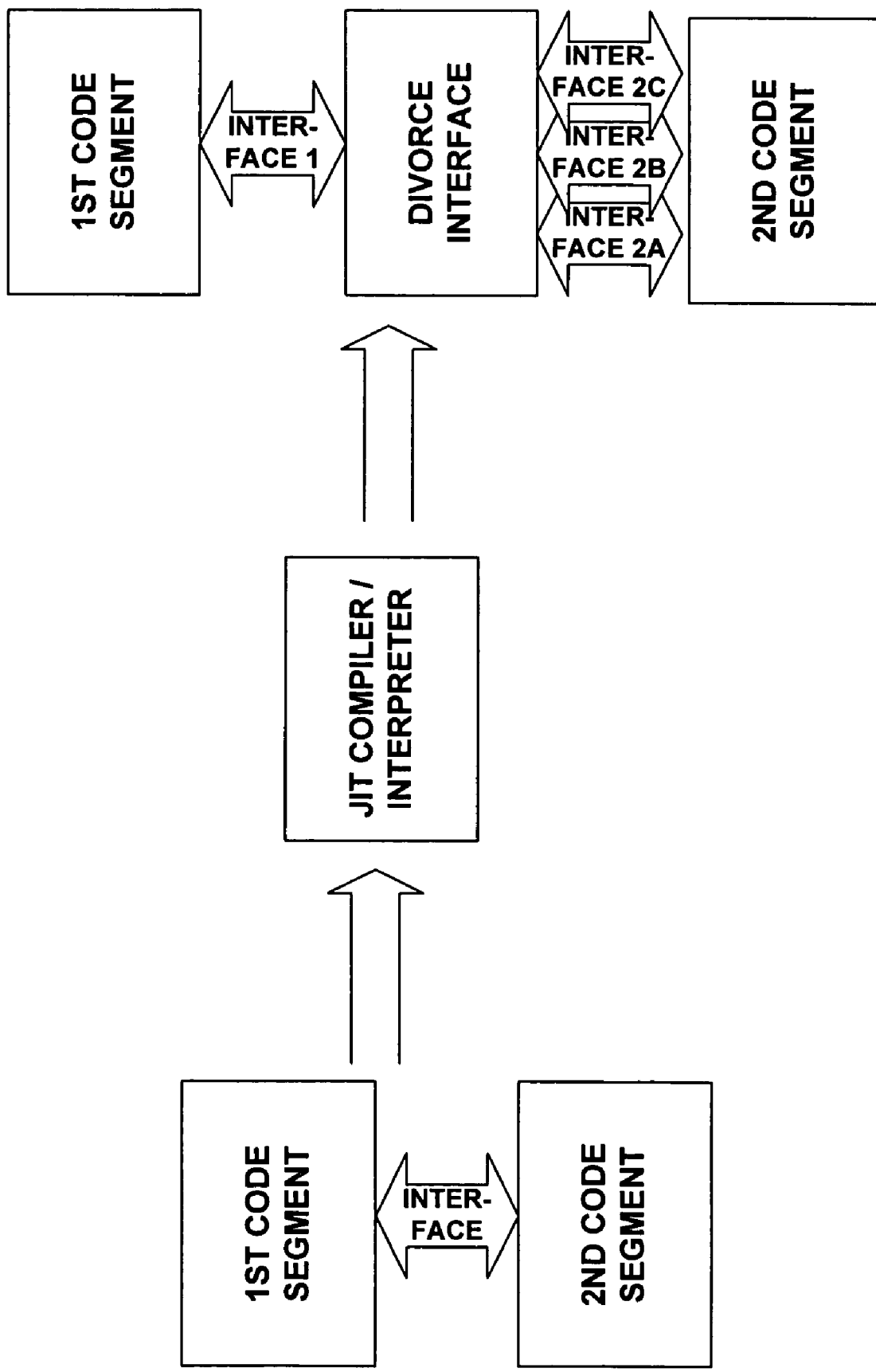
Figure 12B:
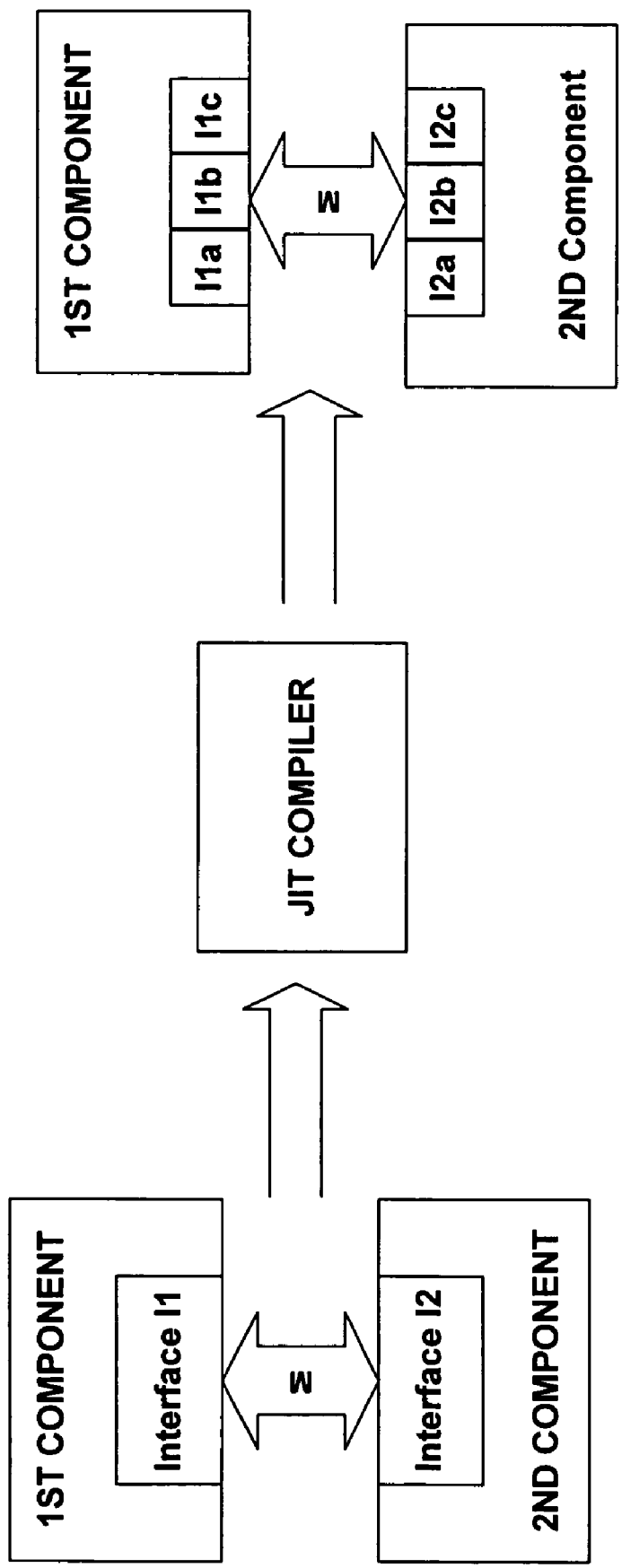

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 12A and 12B. As can be seen in FIG. 12A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 12B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 7A and 7B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use the systems and methods for providing and enabling workbook parameters of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to have workbook parameters. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the workbook parameters of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide and enable workbook parameters in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer-implemented method for discovering, via a Web-based spreadsheet service, a list of one or more parameters associated with a model represented by a spreadsheet document, the method comprising:

requesting a Web-based spreadsheet server to transmit the spreadsheet document for rendering at a client to display the spreadsheet document on a display device, the spreadsheet document comprising a plurality of cells, wherein a first subset of cells of the plurality of cells comprises cells that are designated as parameters associated with the model and a second subset of cells of the plurality of cells comprises cells that are not designated as parameters associated with the model, and wherein each cell in the first subset of cells is designated to receive input from a user to apply to a calculation of the model, and each cell in the second subset of cells is not designated to receive input from the user;

retrieving the list of one or more parameters associated with the model represented by the spreadsheet document, the list of one or more parameters including a name for each parameter and any comments associated with each parameter name, each parameter in the list of one or more parameters corresponding to a cell in the first subset of cells; and presenting a user interface (UI) component for editing values in cells in the first subset of cells corresponding to the one or more of the parameters in the parameter list, wherein each cell in the first subset of cells and each cell in the second subset of cells are both displayed in the UI component and each cell in the first subset is automatically displayed distinctly from each cell in the second subset of cells to indicate that each cell in the first subset of cells is designated to receive input from the user to apply to the calculation of the model.

2. A method according to claim 1, wherein said retrieving includes discovering the list of parameters via an application programming interface.

3. A method according to claim 1, wherein the user interface component is displayed generally adjacent to the spreadsheet document with which the list of parameters is associated.

4. A method according to claim 3, wherein the user interface component is a taskpane.

5. A method according to claim 1, wherein said retrieving includes requesting the list of parameters via the user interface component.

6. A method according to claim 5, wherein said requesting includes requesting the display of the list of parameters via at least one menu command of the user interface component.

7. A method according to claim 1, wherein said retrieving includes displaying the list of parameters as the list of parameter names and displaying user interface controls, wherein each parameter name is associated with at least one user interface control for receiving input by the user for a cell of the spreadsheet document represented by the parameter name.

8. A computer-implemented method for editing, via a Web-based spreadsheet service, a parameter of a list of one or more parameters associated with a model represented by a spreadsheet document, the method comprising:

requesting a Web-based spreadsheet server to transmit the spreadsheet document for rendering at a client to display the spreadsheet document on a display device, the spreadsheet document comprising a plurality of cells, wherein a first subset of cells of the plurality of cells comprises cells that are designated as parameters associated with the model and a second subset of cells of the plurality of cells comprises cells that are not designated as parameters associated with the model, and wherein each cell in the first subset of cells is designated to receive input from a user to apply to a calculation of the model, and each cell in the second subset of cells is not designated to receive input from the user;

retrieving the list of one or more parameters associated with the model represented by the spreadsheet document, the list of one or more parameters including a name for each parameter and any comments associated with each parameter name, each parameter in the list of one or more parameters corresponding to a cell in the first subset of cells; and via a user interface component, receiving edits to at least one parameter of the list of one or more parameters associated with the model represented by the spreadsheet document, wherein each cell in the first subset of cells and each cell in the second subset of cells are both displayed in the UI component and each cell in the first subset is automatically displayed distinctly from each cell in the second subset of cells to indicate that each cell in the first subset of cells is designated to receive input from the user to apply to the calculation of the model.

9. A method according to claim 8, further comprising:

suspending calculation of the model until all information associated with the model is made current by one or more from the group consisting of: automatically obtaining the current information associated with the model and receiving the current information from a user via said edits.

10. A method according to claim 9, wherein said suspending further comprises suspending the display of the spreadsheet document as complete until all information associated with the model is made current by one or more of the group consisting of: automatically obtaining the current information associated with the model and receiving the current information from a user via said edits.

11. A computer-implemented method for designating, via a Web-based spreadsheet service, a list of one or more parameters associated with a model represented by a spreadsheet document the method comprising:

providing a user interface component separate from the spreadsheet;

receiving a definition, via the user interface component, for a first subset of cells of the spreadsheet document, the spreadsheet document comprising a plurality of subsets of cells and the definition designating each cell in the first subset of cells as a parameter to the model represented by the spreadsheet document, wherein each cell in the first subset of cells is designated to receive input from a user to apply to a calculation of the model, and wherein each cell in a second subset of cells of the spreadsheet document not designated as a parameter to the model is not designated to receive input from the user;

loading the defined parameters into the list of one or more parameters associated with the model, the list of one or more parameters including a name for each parameter and any comments associated with each parameter name;

receiving, via the user interface component, instructions specifying an order in which the list of parameters is to be displayed at a client;

receiving a request to transmit the spreadsheet document for rendering at a client; and providing the spreadsheet document and the list of the parameters to the client.

12. A method according to claim 11, further comprising:

storing parameter information with the spreadsheet document including information representing each cell in the first subset of cells that is designated according to the receiving a definition.

13. A method according to claim 12, further comprising: requesting the parameter information stored with the spreadsheet document.

14. A method according to claim 13, further comprising:

via the user interface component, displaying the list of one or more parameters.

15. A method according to claim 14, wherein the displaying the list of one or more parameters includes displaying the list of parameter names and displaying user interface controls, whereby each parameter name includes a user interface control for receiving input that edits a value associated with a cell of the spreadsheet document represented by the parameter name in the first subset of cells designated to receive input.

* * * * *